(12) United States Patent
Petroni et al.

(10) Patent No.: US 11,061,946 B2
(45) Date of Patent: Jul. 13, 2021

(54) SYSTEMS AND METHODS FOR CROSS-MEDIA EVENT DETECTION AND COREFERENCING

(71) Applicant: REFINITIV US ORGANIZATION LLC, New York, NY (US)

(72) Inventors: Fabio Petroni, London (GB); Natraj Raman, London (GB); Armineh Nourbakhsh, Brooklyn, NY (US); Tim Nugent, London (GB); Lucas Carstens, London (GB); John Duprey, Rochester, NY (US); Jochen Leidner, London (GB); Sameena Shah, White Plains, NY (US); Zarko Panic, London (GB)

(73) Assignee: REFINITIV US ORGANIZATION LLC, New York, NY (US)

( * ) Notice: Subject to any disclaimer, the term of this patent is extended or adjusted under 35 U.S.C. 154(b) by 405 days.

(21) Appl. No.: 16/130,390

(22) Filed: Sep. 13, 2018

(65) Prior Publication Data

US 2019/0012374 A1 Jan. 10, 2019

Related U.S. Application Data

(63) Continuation-in-part of application No. 15/143,730, filed on May 2, 2016, now Pat. No. 10,109,023.
(Continued)

(51) Int. Cl.
*G06F 9/54* (2006.01)
*G06F 16/33* (2019.01)
(Continued)

(52) U.S. Cl.
CPC .......... *G06F 16/3344* (2019.01); *G06F 9/542* (2013.01); *G06F 16/35* (2019.01);
(Continued)

(58) Field of Classification Search
CPC ...... G06Q 50/01; G06Q 10/10; G06Q 10/101; G06F 15/18; G06F 16/9038;
(Continued)

(56) References Cited

U.S. PATENT DOCUMENTS 8,762,302 B1 6/2014 Spivack
9,811,866 B1 * 11/2017 Goldman .............. G06F 16/951
(Continued)

FOREIGN PATENT DOCUMENTS

WO 2016057378 A1 4/2016
WO 2016182774 A1 11/2016

OTHER PUBLICATIONS

Zhenguo YangMin ChengQing Li, Yukun LiZehang LinWenyin Liu, "Cross-Domain and Cross-Modality Transfer Learning for Multi-domain and Multi-modality Event Detection", Springer International Publisher, pp. 516-523. (Year: 2017).*

(Continued)

*Primary Examiner* — Merilyn P Nguyen
(74) *Attorney, Agent, or Firm* — Norton Rose Fulbright US LLP

(57) ABSTRACT

A method of providing cross-media event linking may include: receiving, at a first input of an event coreferencing system, a stream of social media postings, and at a second input, a stream of news articles; generating, by the event coreferencing system, a first set of event representations representing events referenced by the social media postings, and a second set of event representations representing events referenced by the news articles; determining, by the event coreferencing system, that at least one of the social media postings references a same event referenced by at least one of the news articles, the determining including determining at least one similarity using data of at least one of the first set of event representations corresponding to the at least one
(Continued)

of the social media postings and data of at least one of the second set of event representations corresponding to the at least one of the news articles; and transmitting, by an output of the event resolution system to the user system, an alert including at least one coreferenced event representation representing the event referenced by the at least one of the social media postings and the at least one of the news articles.

28 Claims, 35 Drawing Sheets

Related U.S. Application Data

(60) Provisional application No. 62/579,218, filed on Oct. 31, 2017, provisional application No. 62/559,079, filed on Sep. 15, 2017, provisional application No. 62/186,419, filed on Jun. 30, 2015, provisional application No. 62/158,609, filed on May 8, 2015.

(51) Int. Cl.

| | | |
|---|---|---|
| *G06F 17/30* | (2006.01) | |
| *G06Q 40/04* | (2012.01) | |
| *G06F 16/9038* | (2019.01) | |
| *G06F 16/9537* | (2019.01) | |
| *G06F 16/9032* | (2019.01) | |
| *G06F 16/35* | (2019.01) | |
| *G06N 5/02* | (2006.01) | |
| *G06Q 50/00* | (2012.01) | |
| *G06N 20/00* | (2019.01) | |

(52) U.S. Cl.
CPC .... *G06F 16/9038* (2019.01); *G06F 16/90332* (2019.01); *G06F 16/9537* (2019.01); *G06F 17/3087* (2013.01); *G06F 17/30684* (2013.01); *G06F 17/30976* (2013.01); *G06F 17/30991* (2013.01); *G06N 5/022* (2013.01); *G06Q 40/04* (2013.01); *G06F 2216/03* (2013.01); *G06N 20/00* (2019.01); *G06Q 50/01* (2013.01)

(58) Field of Classification Search
CPC .......... G06F 16/9537; G06F 17/30684; G06F 17/3087; G06F 17/30991; G06F 9/542; G06F 16/3344; G06F 16/90332; G06F 2216/03; G06N 5/022; G06N 20/00
See application file for complete search history.

(56) References Cited

U.S. PATENT DOCUMENTS

| | | | |
|---|---|---|---|
| 10,109,023 B2 | 10/2018 | Shah et al. | |
| 2006/0253418 A1 | 11/2006 | Charnock et al. | |
| 2008/0021925 A1 | 1/2008 | Sweeney | |
| 2008/0124686 A1 | 5/2008 | Forman | |
| 2009/0327115 A1 | 12/2009 | Schilder et al. | |
| 2010/0121843 A1 | 5/2010 | Goeldi | |
| 2011/0276372 A1* | 11/2011 | Spivack | G06Q 10/109 705/14.5 |
| 2011/0282855 A1 | 11/2011 | Ronen | |
| 2011/0282943 A1 | 11/2011 | Anderson | |
| 2011/0289422 A1* | 11/2011 | Spivack | G06F 16/951 715/739 |
| 2012/0059901 A1 | 3/2012 | Tsai | |
| 2012/0079020 A1 | 3/2012 | Park et al. | |
| 2012/0136865 A1 | 5/2012 | Blom et al. | |
| 2013/0103389 A1 | 4/2013 | Gattani et al. | |
| 2013/0191898 A1 | 7/2013 | Kraft | |
| 2013/0218862 A1 | 8/2013 | Ghosh et al. | |
| 2013/0268260 A1 | 10/2013 | Lundberg | |
| 2013/0290208 A1 | 10/2013 | Bonmassar et al. | |
| 2013/0297694 A1 | 11/2013 | Ghosh | |
| 2013/0304726 A1 | 11/2013 | Sandulescu et al. | |
| 2013/0340076 A1 | 12/2013 | Cecchetti | |
| 2014/0040371 A1 | 2/2014 | Gurevich et al. | |
| 2014/0081636 A1 | 3/2014 | Erhart et al. | |
| 2014/0085328 A1 | 3/2014 | Codella et al. | |
| 2014/0101149 A1* | 4/2014 | Winters | G06F 16/958 707/736 |
| 2014/0201227 A1 | 7/2014 | Hamilton-Dick et al. | |
| 2014/0214670 A1 | 7/2014 | McKenna | |
| 2014/0214819 A1 | 7/2014 | Aitchison | |
| 2014/0236916 A1 | 8/2014 | Barrington et al. | |
| 2014/0337257 A1 | 11/2014 | Chatterjee et al. | |
| 2014/0351005 A1* | 11/2014 | Kohinata | G06Q 50/01 705/7.29 |
| 2015/0081713 A1 | 3/2015 | Alonso et al. | |
| 2015/0120502 A1 | 4/2015 | Jung et al. | |
| 2015/0120783 A1 | 4/2015 | Talmor et al. | |
| 2015/0128222 A1 | 5/2015 | Festa | |
| 2015/0262219 A1* | 9/2015 | Vock | H04L 67/22 705/14.41 |
| 2015/0264518 A1 | 9/2015 | Dal Santo et al. | |
| 2016/0019301 A1 | 1/2016 | Goldenstein et al. | |
| 2016/0026919 A1 | 1/2016 | Kaisser et al. | |
| 2016/0055164 A1 | 2/2016 | Cantarero et al. | |
| 2016/0203498 A1 | 7/2016 | Das et al. | |
| 2017/0140291 A1* | 5/2017 | Wu | H04L 67/22 |
| 2017/0359292 A1* | 12/2017 | Aziz | H04L 51/16 |
| 2018/0268166 A1* | 9/2018 | Alberton | G06F 21/6254 |

OTHER PUBLICATIONS

Russell, Matthew A. "Mining the Social Web: Data Mining Facebook, Twitter, Linkedin, Google+, GitHub and More", O'Reilly Oct. 20, 2013, 430 pages.

Cielen et al., "Introducing Data Science: Big Data, Machine Learning and more, using Python tools", Mar. 3, 2015, Manning Publications, vol. MEAP v2, 25 pages.

Gey et al., "Information Access in a Multilingual World", Proceedings of the SIGIR 2009 Workshop, Jul. 23, 2009, Boston, Massachusetts USA, 12 pages.

Srihari et al., "Information Extraction Supported Question Answering", Cymfony Inc, 1999, 13 pages.

Hobbs et al., "FASTUS: A Cascaded Finite-State Transducer for Extracting Information from Natural-Language Text", http://arxiv.org/abs/cmp-lg/9705013v1, May 20, 1997, 25 pages.

Piskorski et al., "Information Extraction: Past, Present and Future", Multi-source, Multilingual Information Extraction and Summarization 11, Theory and Applications of Natural Language Processing, DOI 10.1007/978-3-642-26569-1_2, © Springer-Verlag Berlin Heidelberg, 2013, pp. 23-49.

Grishman, "Information Extraction: Capabilities and Challenges", 2012 International Winter School in Language and Speech Technologies Rovira i Virgili University Tarragona, Spain, Jan. 21, 2012, 41 pages.

Aone et al., "REES: A Large-Scale Relation and Event Extraction System", ANLP, 2000, pp. 76-83.

Mikheev et al., "Description of the LTG system used for MUC-7", Seventh Message Understanding Conference (MUC-7): Proceedings of a Conference Held in Fairfax, Virginia, Apr. 29-May 1, 1998, Association for Computational Linguistics, 13 pages.

Naughton et al., "Event Extraction from Heterogeneous News Sources", School of Computer Science and Informatics, University College Dublin, Ireland, 2006, 6 pages.

Piskorski et al., "Cluster-Centric Approach to News Event Extraction", Joint Research Centre of the European Commission Institute for the Protection and Security of the Citizen via Fermi 2749, 21027 Ispra, Italy, 2008, 15 pages.

McClosky et al., "Event Extraction as Dependency Parsing", Proceedings of the 49th Annual Meeting of the Association for Computational Linguistics, Portland, Oregon, Jun. 19-24, 2011, Association for Computational Linguistics, pp. 1626-1635.

Ritter et al., "Open Domain Event Extraction from Twitter", KDD'12, Aug. 12-16, 2012, Beijing, China, 9 pages.

(56) References Cited

OTHER PUBLICATIONS

Ji et al., "Refining Event Extraction through Cross-document Inference", Proceedings of ACL-08: HLT, Columbus, Ohio; USA, Jun. 2008, Association for Computational Linguistics; pp. 254-262.
Hogenboom et al., "An Overview of Event Extraction from Text", Erasmus University Rotterdam; CEUR, 2011, 10 pages.
Liao et al., "Using Document Level Cross-Event Inference to Improve Event Extraction", Proceedings of the 48th Annual Meeting of the Association for Computational Linguistics, Uppsala, Sweden, Jul. 11-16, 2010, Association for Computational Linguistics, pp. 789-797.
International Search Report and Written Opinion dated Dec. 7, 2018, of the corresponding International Application PCT/US2018/050885 filed Sep. 13, 2018, 10 pages.
International Search Report and Written Opinion issued in corresponding PCT Application No. PCT/US2016/030357, dated Jul. 29, 2016, 8 pages.
International Preliminary Report on Patentability issued in corresponding PCT Application No. PCT/US2016/030357, dated Nov. 23, 2017, 7 pages.
International Search Report and Written Opinion issued in corresponding PCT Application No. PCT/US2017/052998, dated Nov. 27, 2017, 11 pages
International Search Report and Written Opinion issued in corresponding PCT Application No. PCT/US2017/057216, dated Jan. 12, 2018, 17 pages.
International Search Report and Written Opinion issued in corresponding PCT Application No. PCT/US2017/059533, dated Jan. 4, 2018, 9 pages.
Collobert et al., "Natural Language Processing (Almost) from Scratch", Journal of Machine Learning Research 12, 2011, pp. 2493-2537.
Li et al., "Real-Time Novel Event Detection from Social Media", IEEE International Conference on Data Engineering (ICDE 2017), 11 pages.
McMinn et al., "Building a Large-scale Corpus for Evaluating Event Detection on Twitter", CIKM'13, Oct. 27-Nov. 1, 2013, San Francisco, CA, USA, 10 pages.
Petovic et al., "Using paraphrases for improving first story detection in news and Twitter", Proceedings of the 2012 Conference of the North American Chapter of the Association for Computational Linguistics: Human Language Technologies, Montreal, Canada, 2012, pp. 338-346.
Owoputi et al., "Improved Part-of-Speech Tagging for Online Conversational Text with Word Clusters", Proceedings of NAACL, 2013, pp. 380-390.
Allan, et al. "First Story Detection in TDT Is Hard", Proceedings of the ninth international conference on Information and knowledge management, Virginia, USA, 2000, pp. 374-381.
Castillo et al., Information Credibility on Twitter. WWW 2011, Mar. 28-Apr. 1, 2011, Hyderabad, India. ACM 973-1-4503-0632—Apr. 11, 2003, pp. 675 to 684.
Gupta et al., "Faking Sandy: Characterizing and identifying Fake Images on Twitter during Hurricane Sandy", WWW 2013 Companion, May 13-17, 2013, Rio de Janeiro, Brazil, ACM 978-1-4503-2036—Feb. 13, 2005.
Boididou et al., Challenges of Computational Verification in Social Multimedia, WWW'14 Companion, Apr. 7-11, 2014, Seoul, Korea, ACM 978-1-4503-2745—Sep. 14, 2004, http://dx.doi.org/10.1145/2567948.2579323. pp. 743 to 748.
Finn et al., Investigating Rumor Propagation with Twitter Trails. http://cs.wellesley.edu/.about.pmetaxas/TwitterTrails-investigating-rumor- -propagation.pdf.
Leskovec et al., "Meme-tracking and the Dynamics of the News Cycle", KDD '09 Paris, France Copyright 200X ACM X-XXXXX-XX-X/XX/XX . . . $5.00.
Ratkiewicz et al., Detecting and Tracking Political Abuse in Social Media. Proceedings of the Fifth International conference AAAI on Weblogs and Social Media. pp. 297 to 304.
Ennals et al., Highlighting Disputed Claims on the Web. WWW 2010, Apr. 26-30, 2010, Raleigh, North Carolina, USA, ACM 978-1-60558-799—Aug. 10, 2004.
Osborne et al., Real-Time Detection, Tracking, and Monitoring of Automatically Discovered Events in Social Media. Proceedings of 52nd Annual Meeting of the Association for Computational Linguistics: System Demonstrations, pp. 37-42, Baltimore,Maryland USA, Jun. 23-24, 2014.
Preotiuc-Pietro, et al., A temporal model of text periodicities using Gaussian Processes. Proceedings of the 2013 Conference on Empirical Methods in Natural Language Processing, pp. 977-988, Seattle, Washington, USA, Oct. 18-21, 2013.
Friggeri et al., Rumor Cascades. Proceedings of the Eighth International AAAI Conference on Weblogs and Social Media, pp. 101 to 110.
Mendoza et al., Twitter Under Crisis: Can we trust what we RT? 1st Workshop on Social Media Analytics (SOMA '10), Jul. 25, 2010, Washington, DC, USA. Copyright 2010 ACM 978-1-4503-0217-3 . . . $10.00.
Petrovic et al., "Streaming First Story Detection with application to Twitter", http://homepages.inf.ed.ac.uk/miles/papers/naacl10a.pdf.
Qazvinian, et al., Rumor has it: identifying Misinformation in Microblogs. Proceedings of the 2011 Conference on Empirical Methods in Natural Language Processing, pp. 1589-1599, Edinburgh, Scotland, UK, Jul. 27-31, 2011.
Wu, et al., False Rumors Detection on Sina Weibo by Propagation Structures, http://www.cs.sjtu.edu.cn/.about.kzhu/papers/kzhu-rumor.pdf.
Yu, et al., Automatic Detection of Rumor on Sina Weibo, permission and/or a fee. MDS'12 Aug. 12, 2012, Beijing, China, Copyright 2012 ACM 978-1-4503-1546—Mar. 12, 2008 . . . $10.00.
Sun, et al., Detecting event rumors on sine weibo automatically. In Web Technologies and Applications, pp. 120-131. Springer, 2013.
Extended European Search Report received for European Patent Application No. 16793181.5 dated Aug. 21, 2018, 11 pages.
Wikipedia: "Data processing system", Internet Article, May 1, 2015, Retrieved from the Internet: URL: https://en.wikipedia.org/w/index.php?title=Dataprocessing_system&oldid=60-221914, [retrieved on Aug. 10, 2018], 4 pages.
Wikipedia: "Big data", Internet Article, May 6, 2015, Retrieved from the Internet: URL: https://en.wikipedia.org/w/index.php?title=Big_ data&oldid=661105738, [retrieved on Aug. 10, 2018]; 22 pages.
Wikipedia: "Social network aggregation", Internet Article, Mar. 23, 2015, Retrieved from the Internet: URL: https://en.wikipedia.org./w/index.php?title=Social_network_aggregation&old-id=653153041, [retrieved on Aug. 10, 2018], 3 pages.
Wikipedia: "Mobile Web", Internet Article, Mar. 27, 2015, Retrieved from the Internet:URL https://en.wikipedia.org/w/index.php?title=Mo bil_We b&oldid=653815098, [retrieved on Feb. 24, 2016], 6 pages.
Grainger et al., "Solr in Action", Mar. 9, 2014, Manning Publications Co., 28 pages.
Marmanis et al., "Algorithms of the Intelligent Web", Jul. 8, 2009, Manning Publications, 369 pages.
Ibsen et al., "Camel in Action", Dec. 31, 2010, Manning Publications Co., 122 pages.

* cited by examiner

Table 1: Description of Features

| Category | Feature Name | Feature Type | Feature Description |
|---|---|---|---|
| User | HAS NAME | boolean | If the author has name |
| User | HAS DESCRIPTION | Boolean | If the author has description |
| User | USER HAS URL | Boolean | If the author has URL |
| User | HAS LOCATION | Boolean | If the author has location |
| User | MATCHES CLUSTER LOCATION | Boolean | If the author location matches event location |
| User | IS WITNESS | Boolean | If the author is the witness of the event |
| User | IS PROTECTED | Boolean | If the author is protected |
| User | IS VERIFIED | Boolean | If the author is verified |
| Tweet-level | HAS MULTIMEDIA | Boolean | If the tweet contains multimedia |
| Tweet-level | HAS ELONGATED WORD | Boolean | If the tweet has elongated word |
| Tweet-level | TWEET HAS URL | Boolean | If the tweet has url |
| Tweet-level | HAS NEWS URL | Boolean | If the tweet has url from news organization |
| Tweet-level | NUMBER SENTIMENT POSITIVE WORDS | NUMERICAL | number of positive sentiment word |
| Tweet-level | NUMBER SENTIMENT NEGATIVE WORDS | NUMERICAL | number of negative sentiment word |
| Tweet-level | SENTIMENT SCORE | NUMERICAL | the sentiment score of the tweet |
| Event | EVENT TOPIC | CATEGORICAL | The topic of the event |
| Event | MOST RETWEET CNT | NUMERICAL | the count of the most retweeted tweets |
| Event | RETWEET SUM | NUMERICAL | the sum of number of retweeted tweets |
| Event | HASHTAG SUM | NUMERICAL | the sum of number of hashtags |
| Event | NEGATION FRACTION | NUMERICAL | the fraction of tweets that deny the event |
| Event | SUPPORT FRACTION | NUMERICAL | the fraction of tweets that believe the event |
| Event | QUESTION FRACTION | NUMERICAL | the fraction of tweets that question the event |

Confederate flag supporters rally at Linn Park in Birmingham #ConfederateFlag sp.lc/PNYbZ 502a, 502b, 502c, 502d

FIG. 5a

| markable a | Unit data 1 ... unit data n |
| --- | --- |
| ... | ... |
| markable n | Unit data 1 ... unit data n |

| Confederate flag | Unit data 1 |
| --- | --- |
| Rally | Unit data 1 |
| Linn Park | Unit data 1 |
| Birmingham | Unit data 1 |

```
{
"_index": "blip2016.03.04",
"_type": "twitter",
"_id": "72ea1b70e23411e5a6f5fa163ee42fcd",
"_score": null,
"_source": {
"user_handle": "jackstarr1999",
"friends_count": 9976,
"source": "<a href=\"http://twitterfeed.com\" rel=\"nofollow\">twitterfeed</a>",
"favorite_count": 0,
"content_type": "Twitter",
"urls": [
{
"expanded_url": "http://bbc.in/1Yaj7V0",
"indices": {
"first": 114,
"second": 137
},
"url": "https://t.co/ZIsuqo6Nri",
"domain": "bbc.in",
"display_url": "bbc.in/1Yaj7V0",
"is_short_url": false
}
],
"followers_count": 13262,
"is_retweet": false,
"text": "Mugabe: Foreign firms 'stole diamonds': Zimbabwean President Robert Mugabe
accuses foreign mining companies of... https://t.co/ZIsuqo6Nri",
"retweet_count": 0,
"user_id": "268036007",
"id": "72ea1b70e23411e5a6f5fa163ee42fcd",
"language": "en",
"raw": {
"coordinates": null,
"retweeted": false,
"source": "<a href=\"http://twitterfeed.com\" rel=\"nofollow\">twitterfeed</a>",
"entities": {
"hashtags": [],
"urls": [
{
"url": "https://t.co/ZIsuqo6Nri",
```

FIG. 5f

```
"expanded_url": "http://bbc.in/1Yaj7V0",
"display_url": "bbc.in/1Yaj7V0",
"indices": [
114,
137
]
}
],
"user_mentions": [],
"symbols": []
},
"favorite_count": 0,
"in_reply_to_status_id_str": null,
"geo": null,
"id_str": "705817833658142720",
"in_reply_to_user_id": null,
"timestamp_ms": "1457115059662",
"truncated": false,
"text": "Mugabe: Foreign firms 'stole diamonds': Zimbabwean President Robert Mugabe
accuses foreign mining companies of... https://t.co/ZIsuqo6Nri",
"retweet_count": 0,
"id": 705817833658142700,
"in_reply_to_status_id": null,
"possibly_sensitive": false,
"filter_level": "low",
"created_at": "Fri Mar 04 18:10:59 +0000 2016",
"place": null,
"favorited": false,
"lang": "en",
"contributors": null,
"in_reply_to_screen_name": null,
"is_quote_status": false,
"in_reply_to_user_id_str": null,
"user": {
"utc_offset": 28800,
"name": "jackstarr1999",
"friends_count": 9976,
"screen_name": "jackstarr1999",
"location": "Looking Ahead Maryland",
"protected": false,
"url": null,
```

FIG. 5g

```
"profile_image_url":
"http://pbs.twimg.com/profile_images/3419216884/5fb506f5bfea5ed0b99c2cfa24849c81_normal
.jpeg",
"profile_background_color": "C0DEED",
"profile_use_background_image": true,
"is_translator": false,
"geo_enabled": false,
"description": "buzzing about all kinds of stuff do
say hello trying
to stay positive here",
"profile_link_color": "9EB300",
"id_str": "268036007",
"listed_count": 107,
"default_profile_image": false,
"followers_count": 13262,
"profile_image_url_https":
"https://pbs.twimg.com/profile_images/3419216884/5fb506f5bfea5ed0b99c2cfa24849c81_norm
al.jpeg",
"profile_sidebar_border_color": "EBC1C1",
"profile_background_image_url":
"http://pbs.twimg.com/profile_background_images/219169952/2.jpg",
"favourites_count": 494,
"following": null,
"default_profile": false,
"id": 268036007,
"profile_background_tile": true,
"contributors_enabled": false,
"follow_request_sent": null,
"created_at": "Fri Mar 18 01:18:56 +0000 2011",
"profile_sidebar_fill_color": "DDEEF6",
"lang": "en",
"profile_text_color": "333333",
"notifications": null,
"verified": false,
"time_zone": "Tijuana",
"profile_banner_url": "https://pbs.twimg.com/profile_banners/268036007/1363413391",
"statuses_count": 94782,
"profile_background_image_url_https":
"https://pbs.twimg.com/profile_background_images/219169952/2.jpg"
}
},
"date": "20160304T18:
10:59.000Z",
"possibly_sensitive": false,
"source_id": "705817833658142720",
```

FIG. 5h

```
                    "metadata": {
                    "threat_score": 0,
                    "channels": [
                    "Legal Risks"
                    ],
                    "sdp.sane.credibility": {
            535     "tweet": 0.6819980807625843,
                    "user": 3,
                    "composite": 2.045994242287753
                    },
                    "has_profanity": false,           — 534
            524     "sdp.sane.fact_opinion": {
                    "class": "f",
                    "score": 0.7770599430360502
                    },
                    "tokens": {
                    "TERM": [
                    "Mugabe",
                    "Foreign",
            526     "firms",
                    "stole",
                    "diamonds",
                    "Zimbabwean",
                    "President",
                    "Robert",
                    "Mugabe",
                    "accuses",
                    "foreign",
                    "mining",
                    "companies",
                    "of"
                    ],
                    "MONEY": [],
                    "ALL": [
                    "Mugabe",
                    "Foreign",
                    "firms",
                    "stole",
                    "diamonds",
                    "Zimbabwean",
                    "President",
                    "Robert",
                    "Mugabe",
                    "accuses",
```

FIG. 5i

```
"foreign",
"mining",
"companies",
"of",
"",
"",
"",
"",
"",
"https://t.co/Zlsuqo6Nri",
"",
"",
"",
"",
"",
],
"ENTITY": [
"https://t.co/Zlsuqo6Nri"
],
"JUNK": [
"",
"",
"",
"",
"",
],
"EMOTICON": [],
"PUNC": [
"",
"",
"",
"",
"",
],
"EMOJI": [],
"CRISIS": []
},
"origins": [
"onepctpublic",
"onepctfilter"
],
"sdp.sane.spam_category": "news like"
},
```

FIG. 5j

```
"user": {
"name": "jackstarr1999",
"friends_count": 9976,
"screen_name": "jackstarr1999",
"location": "Looking Ahead Maryland",
"description": "buzzing about all kinds of stuff do
say hello trying
to stay positive here",
"listed_count": 107,
"user_avatar":
"http://pbs.twimg.com/profile_images/3419216884/
5fb506f5bfea5ed0b99c2cfa24849c81_normal
.jpeg",
"followers_count": 13262,
"is_verified": false,
"favourites_count": 494,
"is_default_profile": false,
"has_profile_image": true,
"id": "268036007",
"language": "en",
"created_at": "20110318T01:
18:56.000Z",
"statuses_count": 94782,
"is_protected": false
}
},
"fields": {
"raw.user.created_at": [
1300411136000
],
"raw.timestamp_ms": [
1457115059662
],
"date": [
1457115059000
],
"user.created_at": [
1300411136000
],
"raw.created_at": [
1457115059000
]
},
"sort": [
1457115059000
]
}
```

FIG. 5k

```
{
"_id" : ObjectId("56d9d362498e88c331ace10d"),
"cluster_id" : "705817833658142720",
"created_at" : ISODate("20160304T18:
26:41Z"),
"server_created_at" : ISODate("20160304T18:
26:42.203Z"),
"first_tweeted_at" : ISODate("20160304T18:
10:59Z"),
"merged_at" : ISODate("20160304T18:
26:41Z"),
"news_score" : 0.970382710245269,
"cluster_size" : 3,
"tweet_count" : 3,
"retweet_count" : 0,
"verify_sort" : 1,
"merge_count" : 1,
"verify_count" : 1,
"topic" : "POLITICS",
"summary" : "Mugabe: Foreign firms 'stole diamonds': Zimbabwean President
Robert
Mugabe accuses foreign mining companies of...",
"channels" : [ ],
"tweets" : [
"705817833658142720",
"705821784696696832",
"705817993037553664"
],
"proper_nouns" : [
{
"token" : "robert_mugabe",
"ids" : [
"705817833658142720",
"705821784696696832",
"705817993037553664"
]
},
{
"token" : "mugabe",
"ids" : [
"705817833658142720",
"705821784696696832",
"705817993037553664"
]
}
],
```

- 533 → news_score, cluster_size
- 531 → topic
- 532 → summary
- 504a → proper_nouns block
- 506a → ids list

FIG. 5I

```
"hashtags" : [
{
"token" : "news",
"ids" : [
"705821784696696832"
]
}
],
"ticker_symbols" : [ ],
"additional_tokens" : [
{
"token" : "companies",
"tag_type" : "COMMON_NOUN",
"ids" : [
"705817833658142720",
"705817993037553664"
]
},
{
"token" : "mining",
"tag_type" : "COMMON_NOUN",
"ids" : [
"705817833658142720",
"705821784696696832",
"705817993037553664"
]
},
{
"token" : "president",
"tag_type" : "COMMON_NOUN",
"ids" : [
"705817833658142720",
"705821784696696832",
"705817993037553664"
]
},
{
"token" : "diamonds",
"tag_type" : "COMMON_NOUN",
"ids" : [
"705817833658142720",
"705821784696696832",
"705817993037553664"
]
},
{
"token" : "firms",
"tag_type" : "COMMON_NOUN",
"ids" : [
"705817833658142720",
"705821784696696832",
"705817993037553664"
]
}
],
```

FIG. 5m

```
"urls" : [
"http://bit.ly/bbcNews",
"http://bbc.in/1Yaj7V0"
],
"unit_clusters" : [
{
"tweets" : [
"705817833658142720",
"705817993037553664",    506b
"705821784696696832"
],
"merged_at" :
ISODate("20160304T18:
26:41Z")
}
],
"locations" : [ ],
"merge_history" : [
{
"date" : ISODate("20160304T18:
26:41Z"),
"merge_id" : 1
}
],
"retweet_hierarchy" : [
{
"parent" : "705817833658142720",
"size" : 0,
"children" : [ ]
},
{
"parent" : "705821784696696832",
"size" : 0,
"children" : [ ]
},
{
"parent" : "705817993037553664",
"size" : 0,
"children" : [ ]
}
],
"verify_history" : [
{
"date" : ISODate("20160304T18:
26:41Z"),
"score" : 1
}
],
"verifiability" : true
}
```

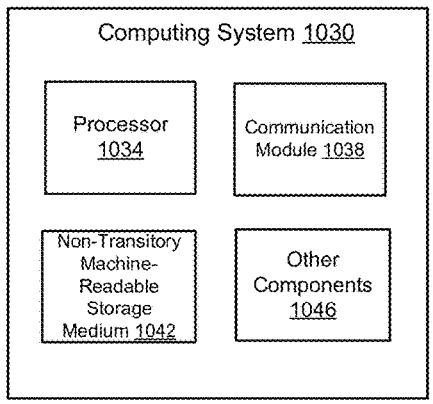
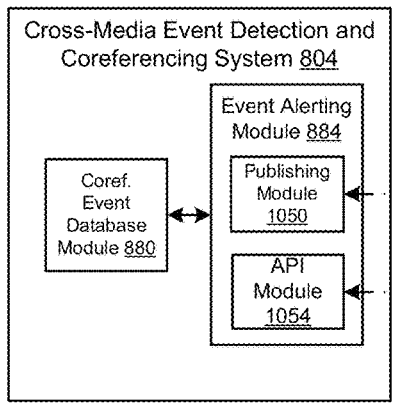
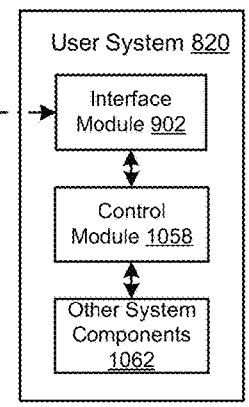
FIG. 20
FIG. 21
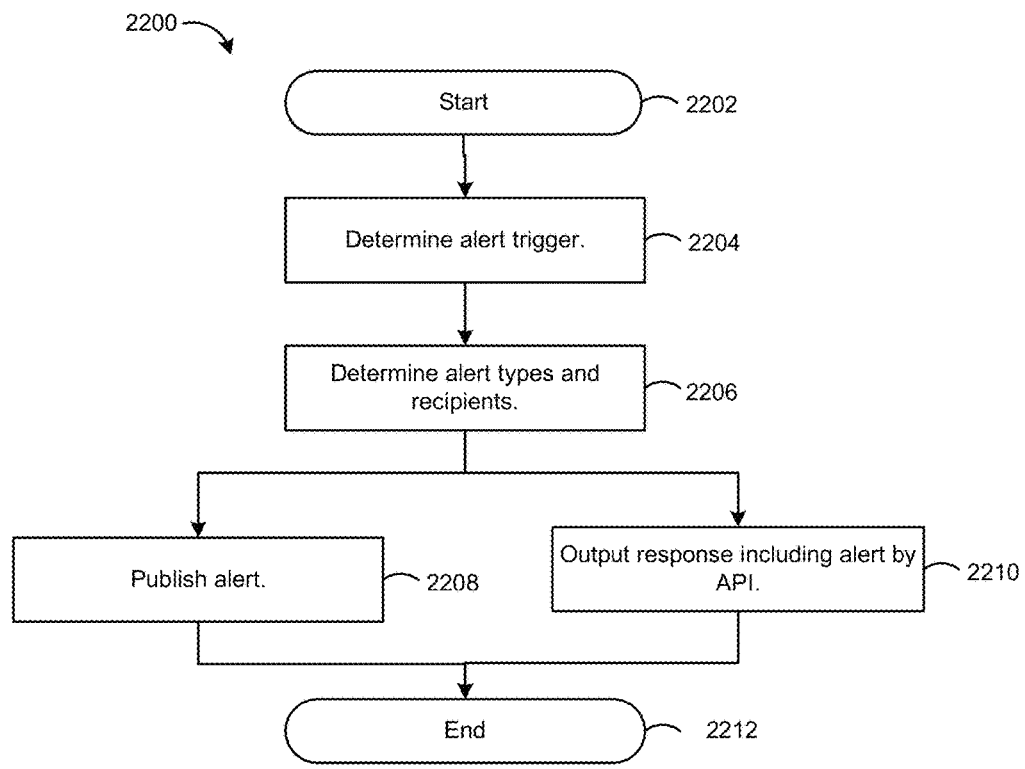
FIG. 22

FIG. 23A

To: marysmith@tradecorp.com
From: eventalert@thomsonreuters.com
Subject: 1 dead after Ophelia storm near Aglish
Date: 17 October 2017

| Event Type | storm |
|---|---|
| Location | Aglish |
| Time | 16 October 2017 |
| Impact | 1 killed |

Woman in her 30s killed in Hurricane Ophelia storms after tree falls onto her car in village.
A woman has been killed after a tree fell onto her car during fierce Hurricane Ophelia storms. The accident happened in the Irish village of Aglish...

@toppinm: Ophelia: One dead after tree falls on car in Waterford via @RTENewsNow
@SkyNewsBreak: RTE reports one person has died in southeast Ireland as a direct of storm Ophelia More on this event at https://event28767.thomsonreuters.com

FIG. 23B

To: 415-444-5555
From: 607-777-8888
1 dead after Ophelia storm near Aglish
More on this event at https://event28767.thomsonreuters.com

FIG. 23C

| Event Type | storm |
|---|---|
| Location | Aglish |
| Time | 16 October 2017 |
| Impact | 1 killed |

Woman in her 30s killed in Hurricane Ophelia storms after tree falls onto her car in village.
A woman has been killed after a tree fell onto her car during fierce Hurricane Ophelia storms. The accident happened in the Irish village of Aglish...

@toppinm: Ophelia: One dead after tree falls on car in Waterford via @RTENewsNow
@SkyNewsBreak: RTE reports one person has died in southeast Ireland as a direct of storm Ophelia More on this event at https://event28767.thomsonreuters.com

FIG. 24

SYSTEMS AND METHODS FOR CROSS-MEDIA EVENT DETECTION AND COREFERENCING

CROSS REFERENCE TO RELATED APPLICATIONS

This application claims priority to U.S. Provisional Patent Application No. 62/559,079, filed on Sep. 15, 2017, and U.S. Provisional Patent Application No. 62/579,218, filed on Oct. 31, 2017; and also is a continuation-in-part of and claims priority to U.S. patent application Ser. No. 15/143,730, filed on May 2, 2016, which claims priority to U.S. Provisional Patent Application No. 62/158,609, filed on May 8, 2015, and U.S. Provisional Patent Application No. 62/186,419, filed on Jun. 30, 2015; each of the above applications being hereby incorporated by reference herein in their entireties.

BACKGROUND INFORMATION

Timely knowledge of events enables better decision-making in a broad range of fields including finance, security, policy, governance, planning and disaster coordination efforts. For example, a government may use knowledge of an event to make better decisions regarding political unrest in a region, a trader may use event knowledge to gain insights into companies vulnerable to natural disasters, and a non-governmental organization may use event knowledge to optimize the allocation of aid workers to where they are needed most.

Extracting attributes of events, such as one or more of the who, what, where, when, why and how of the event, in real time from the text of media, entails many challenges. For example, postings of social media platforms may be mostly noise, such as spam, chit chat, etc., be related to events that are not newsworthy or otherwise of interest for decision making, be one of many postings that discuss a same event, and use custom lingo that obscures the attributes of the event. News articles, while in some respects inherently more event-related than an average social media posting, nonetheless also present difficulties corresponding to their particular format, such correctly extracting the event attributes from a relatively larger amount of information.

Additionally, event information extracted from any given type of media may be subject to limits on its usefulness related to limitations of the type of media itself. For example, while social media, such as Twitter, has proven to be a major source of breaking news across a variety of topics, with one study indicating that Twitter led mainstream news media in more than 20% of disaster-related stories, it is often unreliable, and only provides limited information about the event. By contrast, while traditional news articles are typically rigorously verified before publication, and thus more reliable, and present a rich context that completes the semantic picture about an event, news articles may report breaking news slower than social media.

Finally, extracting event information from more than one media type, such as from both social media and news articles, is challenging due to their difference in text length and reporting style.

Thus, a need exists for systems and methods to perform event extraction on multiple different types of media, in a manner to both correctly extract event information from these sources, and overcome the potential limitations of any given one of these types of media.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

FIG. 4a illustrates exemplary elements in a veracity calculation.

FIG. 5a illustrates an exemplary processing of an item of social media data.

FIG. 5b illustrates an example table representation of mapping key concepts to the respective social media data.

FIG. 5c illustrates an example database representation in relation to the exemplary social media data of FIG. 5a.

FIGS. 5f-5k is an exemplary metadata of ingested data in FIG. 5e.

FIGS. 5l-5n is an exemplary metadata of an event detected cluster with ingested data of FIG. 5e as one of the related unit data.

Figure 6A:
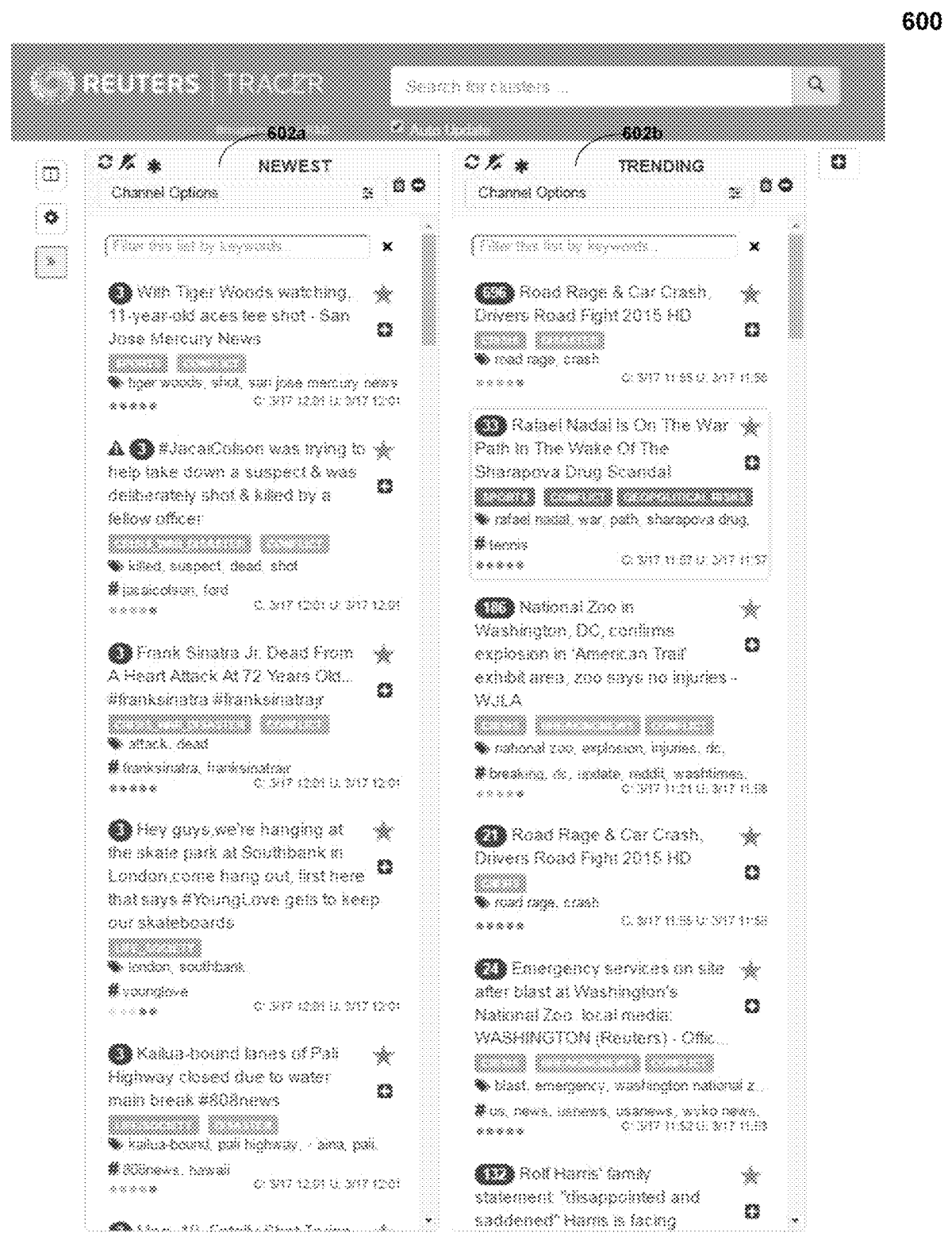

FIG. 6a illustrate default event detected clusters viewable through an exemplary graphical user interface (GUI).

FIG. 6c illustrate a selected event detected cluster viewable through an exemplary graphical user interface (GUI).

FIG. 20 is a schematic diagram depicting an embodiment of a computer system for implementing components of the system for detecting and coreferencing events across media types.

FIG. 21 is a schematic diagram depicting further embodiments of the cross-media event extraction and coreferencing system and user system.

FIG. 22 is a flowchart depicting an embodiment of a method of providing an alert for a coreferenced event.

FIG. 23A-23C depict embodiments of email, text, and feed alerts, respectively, for a coreferenced event.

FIG. 24 depicts an embodiment of an alert application of the user system for interfacing with an API of the cross-media event extraction and coreferencing system.

DETAILED DESCRIPTION OF EXAMPLE EMBODIMENTS

Social Media Event Detection and Verification

Figure 1:
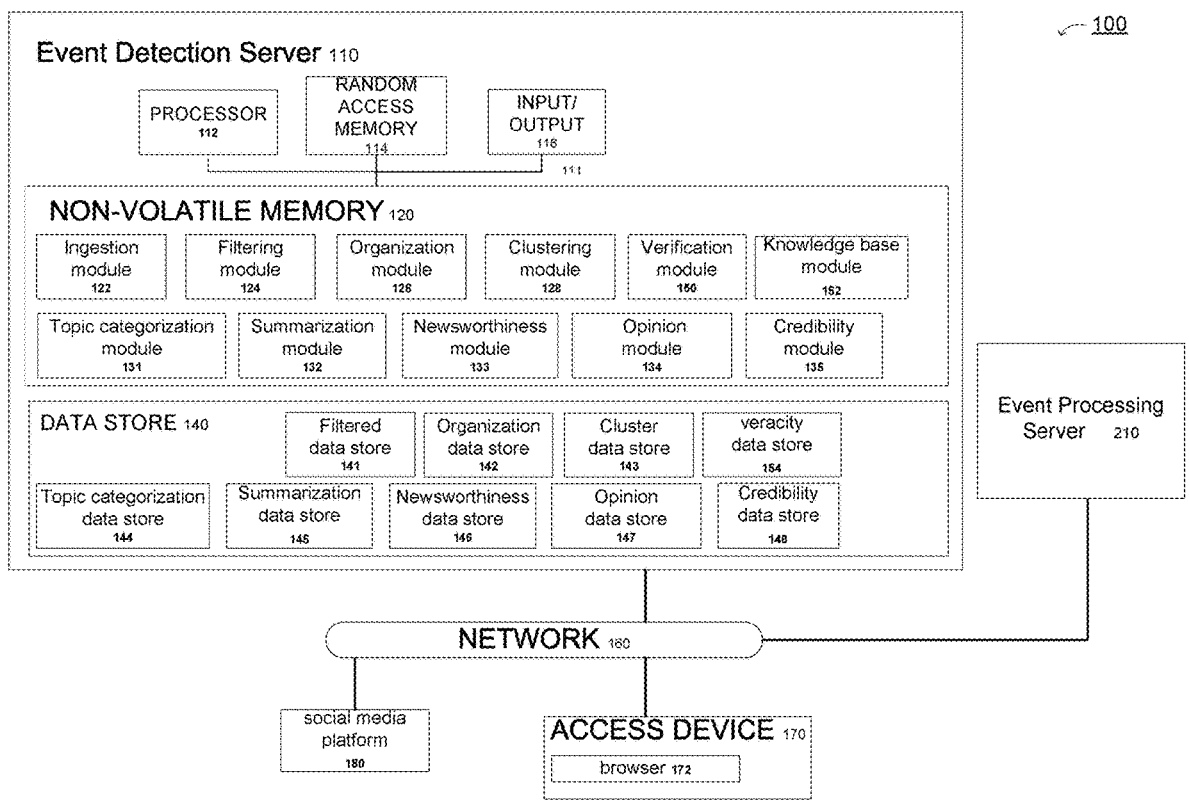
FIG. 1 is an exemplary architectural diagram of the system.
Figure 2:
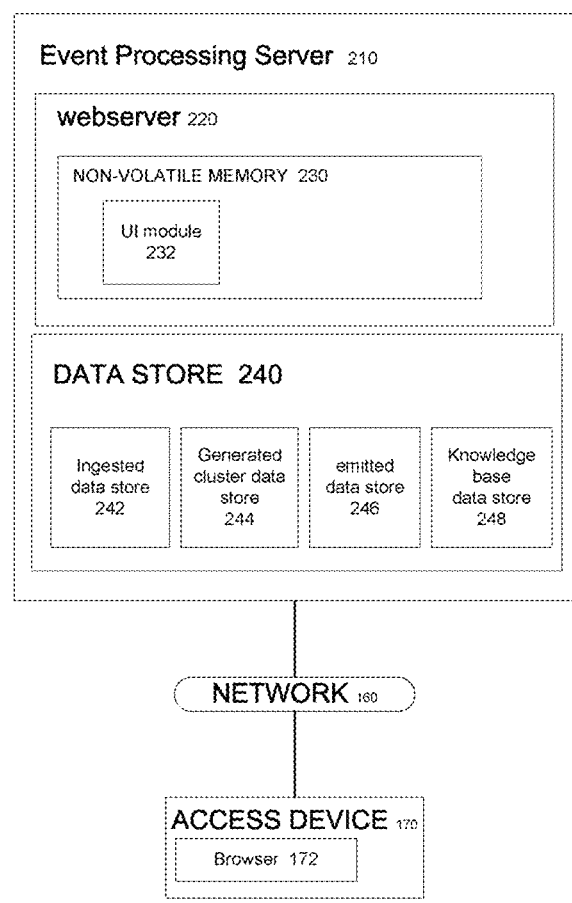
FIG. 2 is an exemplary event processing server.

FIG. 1 shows an exemplary system 100 for detecting and verifying an event from social media data. As shown in FIG. 1, in one implementation, the system 100 is configured to include an event detection server 110 that is in communication with a social media platform 180 over a network 160. The system 100 further comprises an access device 170 that is in communication with an event processing server 210 over the network 160. Further details of an exemplary event processing server 210 are illustrated in FIG. 2. The event detection server 110 is in communication with the event processing server 210 over the network 160. Access device 170 can include a personal computer, laptop computer, or other type of electronic device, such as a mobile phone, smart phone, tablet, PDA or PDA phone. In one implementation, for example, the access device 170 is coupled to I/O devices (not shown) that include a keyboard in combination with a point device such as a mouse for sending an event request to the event processing server 210. Preferably, the access device 170 is configured to include a browser 172 that is used to request and receive information from the event processing server 210. Communication between the browser 172 of the access device 170 and event processing server 210 may utilize one or more networking protocols, which may include HTTP, HTTPS, RTSP, or RTMP. Although one access device 170 is shown in FIG. 1, the system 100 can support one or multiple access devices.

The network 160 can include various devices such as routers, servers, and switching elements connected in an Intranet, Extranet or Internet configuration. In some implementations, the network 160 uses wired communications to transfer information between the access device 170 and the event processing server 210, the social media platform 180 and the event detection server 110. In another implementation, the network 160 employs wireless communication protocols. In yet other implementations, the network 160 employs a combination of wired and wireless technologies.

As shown in FIG. 1, in one implementation, the event detection server 110, may be a special purpose server, and preferably includes a processor 112, such as a central processing unit ('CPU'), random access memory (SRAM') 114, input-output devices 116, such as a display device (not shown), and non-volatile memory 120, all of which are interconnect via a common bus 111 and controlled by the processor 112.

In one implementation, as shown in the FIG. 1 example, the non-volatile memory 120 is configured to include an ingestion module 122 for receiving social media data from the social media platform 180. Exemplary social media platforms are, but not limited to, Twitter®, Reddit®, Facebook®, Instagram® or LinkedIn®. As used herein, the phase "ingested data" refers to received social media data, which may be but is not limited to, tweets and/or online messages, from the social media platform 180.

The non-volatile memory 120 also includes a filtering module 124 for processing ingested data. In one implementation, processing of the ingested data may comprise but is not limited to, detecting language of the ingested data and filtering out ingested data that contains profanity, spam, chat and advertisements.

The non-volatile memory 120 is also configured to include an organization module 126 for analyzing semantic and syntactic structures in the ingested data. In one implementation, the organization module 126 may apply part-of-speech tagging of the ingested data. In another implementation, the organization module 126 detects key concepts included in the ingested data.

As shown in the FIG. 1 example, the non-volatile memory 120 may also be configured to include a clustering module 128 for storing key concepts identified by the organization module 126 into a database, an example of which may be but is not limited to a hashmap, and generating an event detected cluster upon reaching a threshold of distinct ingested data containing common key concepts.

The non-volatile memory 120 is also further configured to include a topic categorization module 131 for classifying the event detected cluster by topics; a summarization module 132 for selecting a representative description for the event detected cluster; and a newsworthiness module 133 for determining a newsworthy score to indicate the importance of the event detected cluster.

The non-volatile memory 120 is also configured to include an opinion module 134 for detecting if the each ingested data in the event detected cluster contains an opinion of a particular person or is factual (e.g., non-opinionated tone), and a credibility module 135, for determining the credibility score of the ingested data. In one implementation, the credibility score is associated with three components: user/source credibility: who is providing the information, cluster credibility: what is the information, and tweet credibility: how is the information related to other information.

The non-volatile memory 120 is further configured to include verification module 150 for determining the accuracy of the event detected cluster. In one implementation, verification may be done by a veracity algorithm which generates a veracity score. In another implementation, the verification module 150 may generate a probability score for an assertion being true based on evidences collected from ingested data.

The non-volatile memory 120 is further configured to include a knowledge base module 152 for developing a database of information pertaining to credible sources and stores the information in a knowledge base data store 248 (FIG. 2).

As shown in the exemplary FIG. 1, a data store 140 is provided that is utilized by one or more of the software modules 124, 126, 128, 131, 132, 133, 134, 135, 150, 152 to access and store information relating to the ingested data. In one implementation, the data store 140 is a relational database. In another implementation, the data store 140 is a file server. In yet other implementations, the data store 140 is a configured area in the non-volatile memory 120 of the event detection server 110. Although the data store 140 shown in FIG. 1 is part of the event detection server 110, it will be appreciated by one skilled in the art that the data store 140 can be distributed across various servers and be accessible to the server 110 over the network 160. As shown in FIG. 1, in one implementation, the data store 140 is configured to include a filtered data store 141, an organization data store 142, a cluster data store 143, a topic categorization data store 144, a summarization data store 145, a newsworthiness data store 146, an opinion fact data store 147, a credibility data store 148 and a veracity data store 154.

The filtered data store 141 includes ingested data that has been processed by the filtering module 124. For example, in one implementation, the ingested data processed by filtering module 124 may be English language tweets that do not contain profanity, advertisements, spam, chat or advertisement.

The organization data store 142 includes ingested data that has been processed by the organization module 126. In one implementation, the ingested data in organization data store 142 may include parts-of-speech tagging notations or identified key concepts, which are stored as a part of ingested data metadata.

The cluster data store 143 includes ingested data that has been processed by filtering module 124 and organization module 126 and is queued to be formed into a cluster. In a further implementation, the cluster data store 143 may also contain a data store or database of key concepts (e.g. hashmap) identified by the organization module 126 matched to corresponding ingested data. As used herein with relation to the database of key concepts, ingested data (e.g., tweets and/or online messages) may also be referred to as unit data.

The topic categorization data store 144 includes the classification of the event detected cluster determined by the topic categorization module 131. Exemplary topics may include but are not limited to business/finance, technology/science, politics, sports, entertainment, health/medical, crisis (war/disaster), weather, law/crime, life/society, and other.

The summarization data store 145 includes a selected unit data that is representative of the event detected cluster as determined by the summarization module 132.

The newsworthiness data store 146 includes the newsworthy score computed by newsworthiness module 133. For example, a higher score would imply that the event detected cluster is likely to be important from a journalistic standard.

The opinion data store 147 includes information pertaining to the determination by the opinion module 134 of whether a given unit data comprises an opinion of a particular person or an assertion of a fact.

The credibility data store 148 includes a credibility or confidence score as determined by the credibility module 135.

The veracity data store 154 includes metrics generated by the verification module 150 regarding the level of accuracy of the event detected cluster. In one implementation, it may be the veracity score determined through a veracity algorithm. In another implementation, it may be a verification score indicating the probability of accuracy based on all the evidences collected from social media.

In a further implementation, as shown in FIG. 1, the Event Processing Server 210 includes a processor (not shown), random access memory (not shown) and non-volatile memory (not shown) which are interconnected via a common bus and controlled by the processor. In one implementation, the Event Processing Server 210 is responsible for storing processed information generated or to be used by the Event Detection Server 110. In another implementation, the Event Processing Server 210 also communicates directly with the user. The Event Processing Server 210 is further illustrated in relation to FIG. 2.

It should be noted that the system 100 shown in FIG. 1 is one implementation of the disclosure. Other system implementations of the disclosure may include additional structures that are not shown, such as secondary storage and additional computational devices. In addition, various other implementations of the disclosure include fewer structures than those shown in FIG. 1.

Turning now to FIG. 2, the Event Processing Server 210 in one implementation contains a web server 220 with a non-volatile memory 230 and a UI (user interface) module 232.

The UI module 232 communicates with the access device 170 over the network 160 via a browser 172. The UI module 232 may present to a user through the browser 172 detected events clusters and their associated metadata. Exemplary associated metadata may be but are not limited to the topic, newsworthiness indication and verification score associated with one or more event detected clusters.

The event processing server 210 may further comprise a data store 240 to host an ingested data store 242, a generated cluster data store 244, an emitted data store 246 and the knowledge base data store 248.

The ingested data store 242 includes ingested data received from social platform 180 and processed by ingestion module 122.

The generated cluster datastore 244 includes the event detected clusters that have been processed by modules 122, 124, 126, 128, 131, 132, 133, 134, 135 and 150.

Figure 3A:
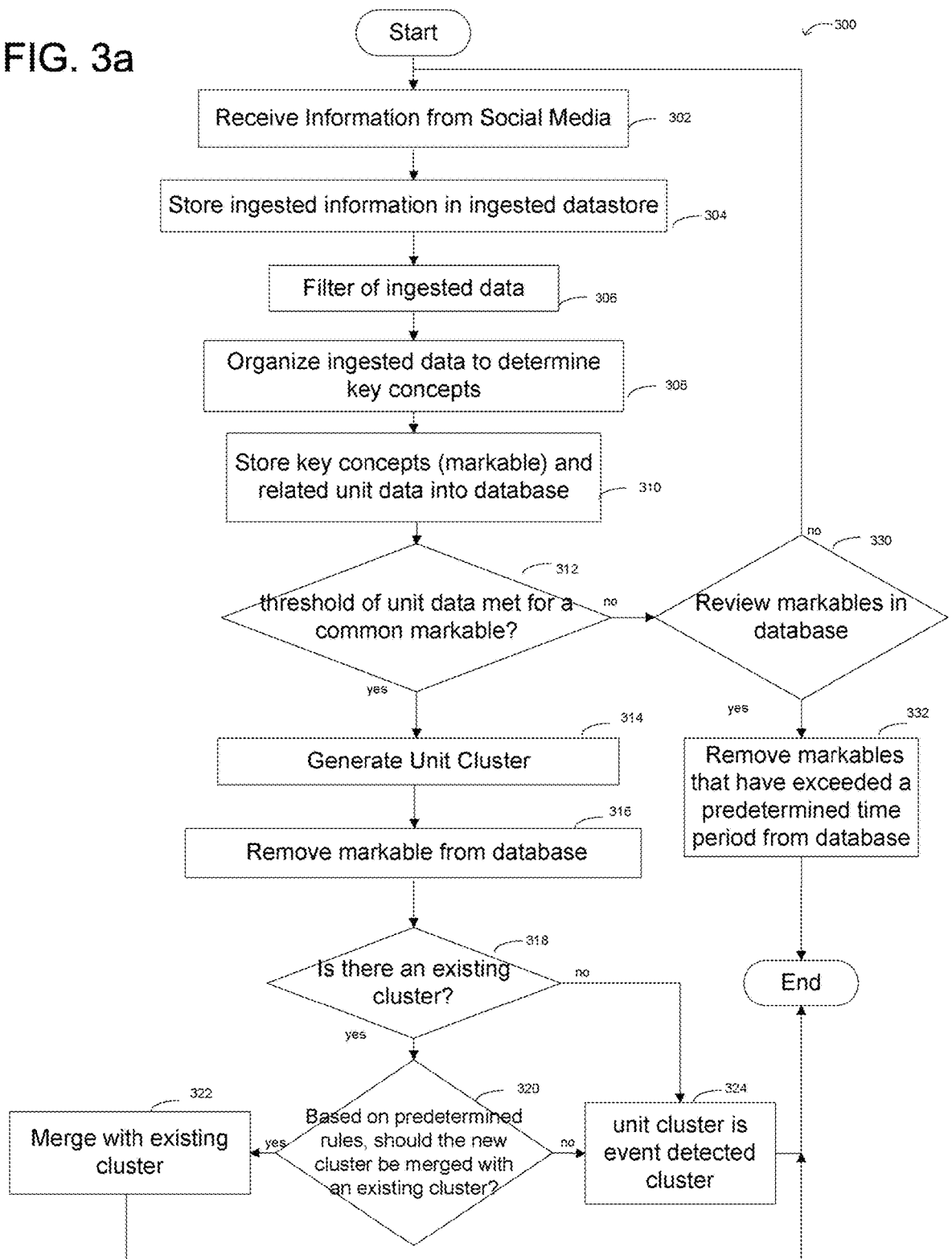
FIG. 3a is an exemplary flow chart of one implementation of the disclosure.

The emitted data store 246 includes key concepts and corresponding ingested data that were discarded by the clustering module 128, as explained in relation to steps 330-332 of FIG. 3a. In an alternative implementation, the emitted data store may be located in the event detection server 110.

The knowledge base data store 248 includes a list of credible sources as determined by knowledge base module 152.

In one implementation, the Event Processing Server 210 communicates with the Event Detection Server 110 over the network 160. In another implementation, the Event Processing Server 210 is included in the nonvolatile memory 120 of Event Detection Server 110. In yet another implementation, the Event Processing Server 210 is configured to communicate directly with the Event Detection Server 110. An exemplary event processing server 210 may be but is not limited to MongoDB® or ElasticSearch®.

Referring now to FIG. 3, an exemplary method 300 of detecting and verifying social media events is disclosed. As shown in the FIG. 3, at step 302, information from social media platform 180 is retrieved by the ingestion module 122 of event detection server 110. In one implementation, the ingestion module 122 may include scripts or code that interface with the social media platform 180 application API. The scripts or code are also able to request and pull information from the APIs. In another implementation, the ingestion module 122 may determine the location of the ingested data and the user and append location information as metadata to the ingested data.

Next at step 304, upon receiving the ingested data, the ingestion module 122 stores the ingested data into the ingested data store 242 of event processing server 210. In a further implementation, metadata may also be generated by the ingestion module 122 and appended to the ingested data prior to storage in the ingested data store 242.

In an alternative implementation, the knowledge base module 152 may compile the list of credible sources using information gathered from the ingested data. The knowledge base module 152 stores the list of credible sources in the knowledge base data store 248. In one implementation, the knowledge base module 152 may analyze user profiles from the ingested data to capture information such as user affiliations or geography to be used for compilation of the list of credible sources. In a further implementation, the knowledge base module 152 takes established credible users and reviews lists generated by the user for relevant information that may be used to generate the list of credible sources. For example, if a credible user has a tech list containing a list of tech users, user IDs and related information (e.g., a related tech list associated with the user ID) associated with the tech users are also mined for information. The knowledge base module 152 continually updates knowledge base data store 248 as further social media data are ingested and may be evaluated at a predetermined frequency to ensure the information is current.

Continuing onto step 306, the filtering module 124 retrieves the ingested data from ingested data store 242 and processes the ingested data. Exemplary processing by the filtering module 124 may include language detection and profanity detection. In one implementation, the filtering module 124 determines the language of the ingested data and eliminates ingested data that are not in English. In an alternative implementation, elimination of ingested data can be for other languages.

The filtering module 124 may also detect profane terms in the ingested data and flag the ingested data that contains profanity. Ingested data containing profanity is then eliminated by the filtering module 124. In one implementation, the detection of profanity is based on querying a dictionary set of profane terms.

In a further implementation, the filtering module 124 may utilize a classification algorithm that removes ingested data that is recognized to be spam, chat or advertisements. Exemplary indication of spam would be ingested data saying "follow me @xyz". Exemplary chat in ingested data may be general chatter about daily lives like "good morning". Exemplary advertisements in ingested data may contain language such as "click here to buy this superb T-shirt for $10." In one implementation, the classification algorithm is based on a machine learning model that has been trained on a number of features based on language (i.e., terms used in constructing the data), message quality (i.e., presence of capitalization, emoticons), user features (i.e., average registration age). Exemplary machine learning models include, but are not limited to, Support Vector Machines, Random Forests, and Regression Models. The filtered ingested data is then stored in filtered data store 141.

Once filtering has been completed by the filtering module 124, at step 308, the organization module 126 retrieves the now filtered ingested data from filtered data store 141 and detects key concepts in the ingested data. In one implementation, the organization module 126 detects semantic and syntactic structures in the ingested data.

In another implementation, the organization module 126 may apply part-of-speech tagging, through a Part-Of-Speech tagger, on the ingested data. For example, the organization module 126 recognizes verbs, adverbs, proper nouns, and adjectives in the ingested data. In a further implementation, there may be a predefined list of terms used for recognition by the organization module 126 that includes, but are not limited to, crisis terms like "fire," "tornado", or "blast". The predefined list of terms may also be further customized based on concepts that are not proper nouns but are a good proxy for the main context of the ingested data.

Part-of-speech tagging notations or identified key concepts may then be stored into the organization data store 142. In one implementation, the Part-of-speech tagging notations or identified key concepts may be appended to the ingested data metadata and stored into the organization data store 142.

All key concepts, proper nouns, hashtags, and any list terms found in the ingested data are designated as a 'markable'. In a further implementation, the markable may be further concatenated to produce markables that are more meaningful. For example, if "New" followed by "York" has been identified as a markable, then the terms are concatenated to indicate the revised markable as "New_York" and removing individual "New" and "York".

Once the key concepts are identified by the organization module 126, the clustering module 128 at step 310, obtains organized ingested data from organization data store 142 and creates a database of key concepts with a reference to the corresponding ingested data. In one implementation, the referenced corresponding ingested data maybe in the form of a unit data. This database is then stored in cluster data store 143.

At step 312, each key concept has a predefined time frame to grow to a minimum count of unit data required to be considered an unit cluster or else it is discarded. An exemplary threshold count, may be but is not limited to, three (3) unit data for a key concept. To illustrate, if collective users (i.e., authorship value) are mentioning similar key concepts in their social media data, there maybe a likelihood of an emerging event.

Once a threshold number of unit data containing common markables have been met, in step 314, the clustering module 128 generates a unit cluster. In a further implementation, the unit data corresponding to the markable are generated as the unit cluster in step 314 and are removed from the database in step 316.

However, if the threshold has not been met, at step 330, the markables in the database may be reviewed. For markables that have not exceeded a predefined time window, (i.e. 2 hours), the process starts again from step 302 with newly ingested data. To illustrate, this may be social media information that is so fresh that other collective users did not get to mention it yet.

However, markables that never grow to the minimum threshold of unit data after a predefined time window (i.e., 2 hours) are removed from the database at step 332. The discarded markables and unit data may be sent to the emitted data store 246 along with other metadata about it. To illustrate, social media information that no other users are mentioning might not be an event of importance to a professional consumer.

Returning to step 314, once the unit cluster is generated, its corresponding markables and unit data are removed from the database in step 316. The newly generated unit cluster is checked against a set of previously generated event detected clusters, at step 318. The set of previously generated event detected clusters may be located in the cluster data store 143. In an alternative implementation, generated clusters may be located in the generated cluster data store 244 of the event processing server 210.

If there is not a match to the set of previously generated event detected clusters, continuing onto step 324, the unit cluster is determined to be a new event detected cluster by the clustering module 128 and is stored into cluster data store 143.

However, if there is a match to existing generated event detected clusters, based on a set of predefined rules, at step 320, a decision to either merge two similar clusters or keep them as two separate clusters is made. In one implementation, the decision to merge may be based on the same underlying concepts.

If the decision is to merge two similar clusters, continuing onto step 322, the cluster module 128 merges the clusters and stores the merged event detected cluster is stored into cluster data store 143. For example, if social media information is the same as a previously detected event, the social media information is then merged with the previously detected event.

However, if the clusters are to remain distinct, continuing onto step 324, the unit cluster is determined to be a new event detected cluster and is stored into cluster data store 143. For example, social media information that is distinct from the previously detected events maybe an event of importance to a professional consumer and should be noted as such, therefore the unit cluster is considered by the clustering module 128 as an event detected cluster.

Figure 3B:
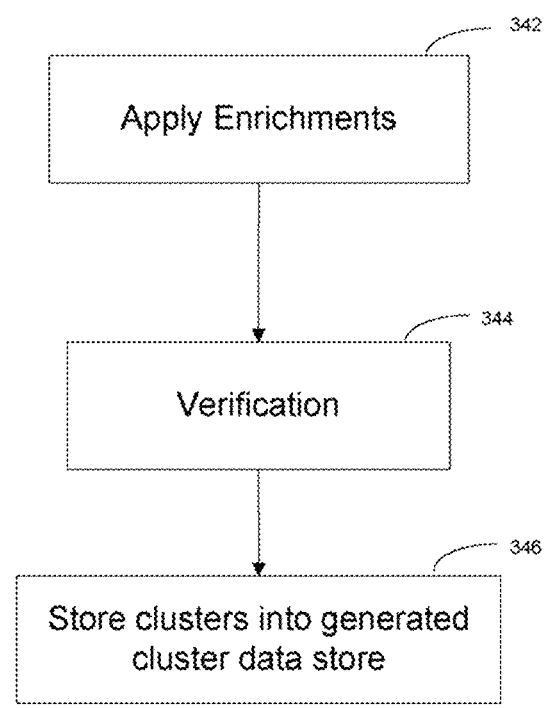
FIG. 3b is an exemplary flow chart of another implementation of the disclosure.

Turning now to FIG. 3b, in a further implementation, upon storing the event detected cluster, at step 342, enrichments may be applied to the event detected cluster. Exemplary enrichments are, but not limited to, topic categorization, summarization, newsworthiness, opinion and credibility.

As mentioned previously, the topic categorization module 131 may determine one or more classification for the event detected cluster. The classification may be a taxonomy of predefined categories (i.e., politics, entertainment). The classification is added to the metadata for the event detected cluster.

The summarization module 132 may select a unit data in the event detected cluster that best describes the cluster. The selected unit data is used as a summary for the event detected cluster. In a further implementation, the summarization module 132 may also utilize metrics such as the earliest unit data or a popular unit data in the generation of the summary for the event detected cluster. The summary is added to the metadata for the event detected cluster.

The newsworthiness module 133 uses a newsworthiness algorithm to calculate a newsworthy score. The newsworthy score is an indication of the importance of the event detected cluster from a journalistic standard. For example, an event detected cluster concerning an airplane crash for a breaking news event is considered more important than a cluster around a viral celebrity picture. In one implementation, the newsworthiness algorithm is a supervised Machine Learning algorithm that has been trained on a newsworthy set of ingested data and predicts a newsworthy score for any ingested data that is passed through it. The newsworthy score is added to the metadata for the event detected cluster.

The opinion module 134 determines if the each unit data in the event detected cluster contains an opinion of a particular person or an assertion of a fact. In one implementation, for unit data that are an assertion of fact, a score indicative of an assertion as a fact is also assigned to the unit data and likewise for an opinion. In a further implementation, the opinion module 134 executes in a two stage process. In the first stage, a rule based classifier is applied that uses simple rules based on presence/absence of certain types of opinion/sentiment words, and/or usage of personal pronouns to identify opinions. In the second stage, all unit data that are indicated to be non-opinions are passed through a bag-of-words classifier that has been trained specifically to recognize fact assertions. The determination of fact or opinion is then stored as a part of the event detected cluster metadata.

The credibility module 135 determines the confidence score of each unit data in the event detected cluster. In one implementation, the confidence score is associated with three components: source credibility, cluster credibility, and tweet credibility. The score and information generated by the components are then stored as a part of the event detected cluster metadata.

Source credibility relates to the source of the unit data. If the source is a credible source, for example, an authority such as the White House stating an event is more credible than a random unknown user. In one implementation, source credibility is measured by an algorithm that uses features like, but not limited to, age of the user, description, and presence of a profile image of the social media account.

Cluster credibility relates to what the information is. Typically, detected events clusters containing genuine events may have different growth patterns from fake detected events clusters, such as a fake event might be driven by negative motivations like purposely spreading rumors. A supervised learning model is used based on historical data that identifies likelihood of the event detected cluster being true or false based on growth patterns.

Tweet credibility relates to the content of the individual tweets in the unit data and the language being mentioned therein. In one implementation, the unit data is evaluated against a set of textual words trained on credible and noncredible unit data.

Next, at step 344, the verification module 150 analyzes the enrichments applied to the event detected cluster and its related unit data to determine the level of accuracy of the event detected cluster. In one implementation, the verification module 150 may generate a veracity calculation based on three categories: user, tweet-level or social media data level and event, from the unit data. In another implementation, the verification module 150 may compute a probability of the propagating rumor being true using extracted language, user and other metadata features from event detected cluster and its related unit data. Verification is explained in greater detail in relation to FIGS. 4a and 4b.

Finally, at step 346, the enriched event detected cluster is then stored in generated cluster data store 244 of the event processing server 210.

FIG. 4a illustrates an exemplary description of categories used in a veracity calculation. The first category for consideration pertains to a user category. In one implementation, the user features 402a are boolean and may include, but are not limited to: name, description, url, location, matches cluster location, witness, protected (i.e., private or not), verified, as illustrated in FIG. 4a. The user category captures user specific information gathered from their social media profile. Exemplary features like location or url can weigh into the credibility of the user. For example, if the user is anonymous for their location, it is hard to determine the accuracy of what they are saying. However, if their location matches the location of the event detected cluster, the incident as gathered from the ingested data might be viewed in a more favorable way as being accurate.

The secondary category for consideration is on the social media level. In one implementation, the social media features 402b of boolean type, may include, but are not limited to: multimedia, elongated word, url and news url, as illustrated in FIG. 4a. The social medial category may further include numerical type: number sentiment positive words, number sentiment negative words, and sentiment score, which is of numerical type. For example, if a user is attaching a picture or multimedia to the reported incident, that can be a clear indication of the accuracy of the reporting on the social media data. In another example, the type of words used by the user, especially elongated words, i.e. "OMMMMMMGGG!!" might convey the user's shock related to the event and lend itself to a more credible event. However, if the user uses a url in the social media data, the user might be sharing by reiteration. In a further implementation, the sentiment of the ingested data is also examined. The ingested data may be checked against a set of positive and negative words for an indication of the sentiment. As an example, if the event detected cluster pertains to a disaster, the general tone of the ingested data should be negative.

The third category for consideration is event features. In one implementation, the event features 402c may include: event topic, which may be categorical type, and highest retweet count, retweet sum, hashtag sum, negation fraction, support fraction, question fraction, which may be of numerical type, as illustrated in FIG. 4a. In one implementation, if the ingested data are twitter tweets, the retweeting count and sum are valued, with the assumption that the count correlates to the popularity of the event which weighs more in favor of being accurate. In another implementation, hashtags may also be an indicator of the event. For example, sports related ingested data may contain many hashtags, while a disaster related ingested data may not have many hashtags, as there might not be time to list so many hashtags when a disaster is unfolding at the location of the user. In yet another implementation, the algorithm also takes into consideration the fraction of ingested data that deny, believe or question the event.

The verification module 150 generates a matrix that is aggregated based on the three categories to generate a veracity score between −1 to 1, ranging from a false rumor to a true story. In one implementation, as illustrated in FIG. 5n, the veracity score 550 may be added to the metadata of the event detected cluster. In a further implementation, as illustrated in FIG. 6b, the veracity score 614 may be presented to the user in the form of circle representations.

Figure 4B:
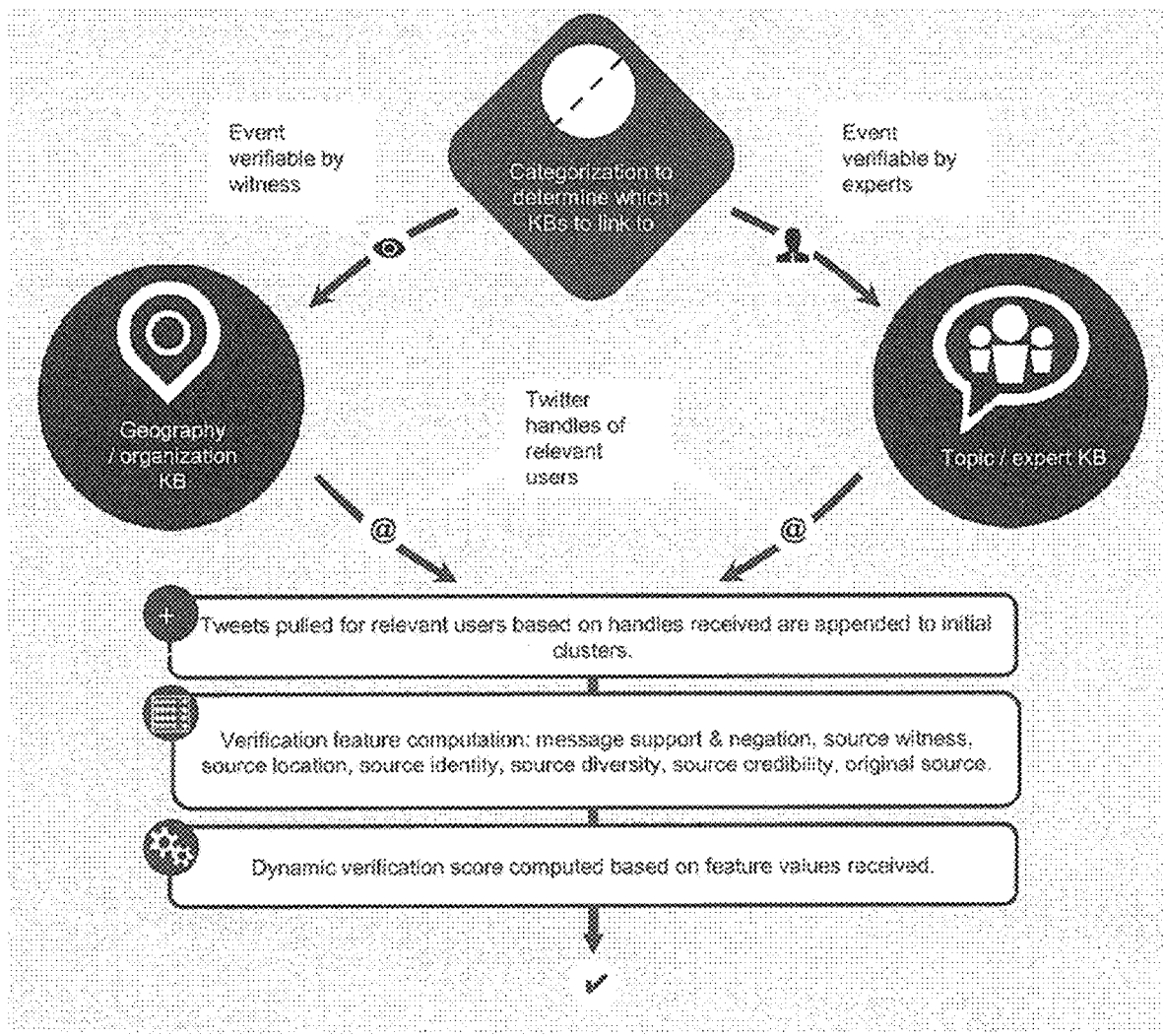
FIG. 4b illustrates exemplary elements in an alternative verification calculation.

FIG. 4b illustrates the determination by the verification module 150 a probability score for the event detected cluster being true based on information collected from social media. In the FIG. 4b example, Twitter is used as an exemplary social media platform. In one implementation, the verification module 150 first determines if the unit data of the event detected cluster is an expert type assertion or a witness type assertion.

Expert type assertions are assertions that likely to be made only by people or organizations that are considered authoritative for that assertion. An exemplary expert type assertion may be the company Apple® asserting that they will be releasing a new iPhone®. The verification module 150 may invoke the knowledge base module 152 to determine if the identified user of the unit data (i.e., Apple®) is a credible source and awards a higher score if the unit data is originating from a credible source.

In a further implementation, if the user of the unit data is from the list of credible sources determined by the knowledge base module 152 as authoritative on that topic, then a higher score is given. If the user of the ingested data is not authoritative, then other experts and their recent tweets are considered by the knowledge base module 152 to collect or negate the user assertion.

Witness type assertions are assertions any random user may potentially make. These include crises type of events (for example, User123 assets that an explosion took place in a particular area.) In one implementation, the verification module 150 compares either the topic or the geography of the unit data against other unit data from the same geographic area. If other users are not mentioning the same assertion during the same time period, then a lower score may be assigned.

In yet a further implementation, a knowledge base of organizations as determined by the knowledge base module 152 may also be considered. Social media data from the collective knowledge base of organizations may also be processed by the Event Detection Server 110 to determine if they are discussing about a similar assertion and are used to compare with the current unit data to determine level of authenticity.

The verification module 150 may then assign a probability that indicates its likeliness to be true or false. In one implementation, the verification module may algorithmically compute a score between −1 and 1, where 0 is neutral depicting our lack of information in the matter, 1 depicts highest level of confidence in the assertion being true and −1 being the highest level of confidence in it being false. For example, if information from very credible sources have confirmed that an assertion is true, then its score is likely 1. However for cases that we cannot find concrete evidences for near accuracy of its authenticity or truthfulness, the score will then fall between −1 and 1 depending on the type of evidences collected. The confidence may be re-evaluated when new evidences are included in its assessment.

Referring now to FIG. 5a, an exemplary ingested data is illustrated. In one implementation, the ingested data may be but is not limited to a tweet. The organization module 126 analyzes semantic and syntactic structures in the ingested data to identify key concepts. In this example, terms 502a-502d, such as "confederate flag" "rally" "Linn Park" "Birmingham" are identified key concepts by organization module 126. Although four key concepts are identified in this example, there may be n number of terms identified by the organization module 126. In one implementation, the key concepts are stored in a database 500, with the key concepts designated as a "markable" and the corresponding originating ingested data as a "unit data", as illustrated in FIG. 5b. As shown in FIG. 5b, there may be a column 504 for n number of markables, each with corresponding column 506 pertaining to n number of unit datas. In one implementation, the database may be a hash table or a hashmap.

Turning to FIG. 5c, an example of the database using information from FIG. 5a is disclosed. In this example, the ingested data in FIG. 5a is represented as Unit data 1. The identified key concepts 502a-502d are listed as markable 508a-508d in the markable column 504, and the originating ingested data as Unit data 1 is also noted in the corresponding column 506. As additional ingested data are processed in accordance with steps 302-310 of FIG. 3a, each xth ingested data is represented as "Unit data x". For example, the second ingested data may be represented as "Unit data 2". If "Unit data 2" also contains the markable "Linn Park", it may be added to the row for Linn Park in the database 500 and "Unit data 2" will be noted along with "Unit data 1" in the corresponding column 506. Once the unit data for a markable grows and reaches a predefined threshold, it is then emitted as an event detected cluster. To put it a different way, this is an indication that multiple users are reporting similar events and therefore, may be an emerging event.

Figure 5D:
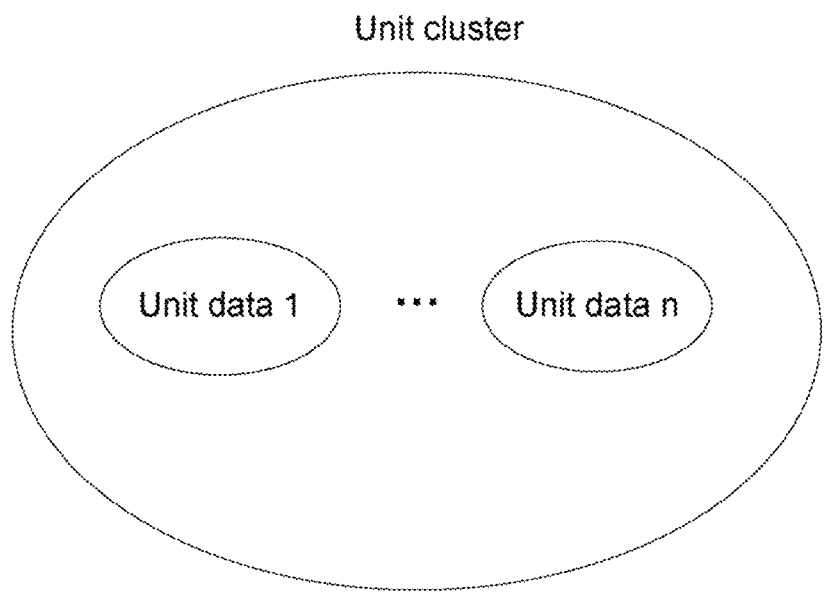
FIG. 5d illustrates an example unit cluster.
Figure 6B:
FIG. 6b illustrate exemplary event detected clusters viewable through an exemplary graphical user interface (GUI).

Turning to FIG. 5d, an exemplary unit cluster is illustrated. In one implementation, the unit cluster becomes the event detected cluster if the clustering module 128 determines that there is not already an existing cluster, or if there is an existing cluster but based on predetermined rules, the clustering module 128 determines not to merge with an existing cluster. The unit cluster comprises a threshold number n of n unit data (e.g., 3 unit clusters).

Figure 5E:
FIG. 5e illustrates an exemplary ingested data.

FIG. 5e is another exemplary ingested data in the form of a tweet. This ingested data is one of the many unit data from an exemplary event detected cluster pertaining to "Mugabe: Foreign firms 'stole diamonds': Zimbabwean President Robert Mugabe accuse foreign mining companies of . . . ". This ingested data was also selected by the summarization module 132 as a representative summary of the event detected cluster.

FIGS. 5f-5k are exemplary metadata of ingested data in FIG. 5e. The ingested data comprises default metadata generated by the social media platform (i.e, twitter metadata) as illustrated in FIGS. 5f-5h and 5k. The Event Detection Server generates additional metadata and is appended to metadata of ingested data described above, and is illustrated in FIGS. 5i and 5j.

Referring now to FIG. 5i, the added metadata includes, but is not limited to, the credibility score 535 as determined by the credibility module 135; the opinion score 534 as determined by the opinion module 134; the profanity indicator 524 as determined by filtering module 124 and the markables 526 as determined by organization module 126.

FIGS. 5l-5n are an exemplary metadata of an event detected cluster with ingested data of FIG. 5e as one of the related unit data.

In FIG. 5l-5m, the cluster metadata includes, but is not limited to, the newsworthiness score 533 as determined by newsworthiness module 133; the topic 531 as determined by topic categorization module 131; the summary 532 as determined by summarization module 132 and markables 504a as identified in the unit data by the organization module 126 and selected to form the event detected cluster. Each markables 504a may also include the respective unit data 506a information.

Continuing on to FIG. 5n, the cluster metadata includes, but is not limited to, unit data 506b forming the event detected cluster and the veracity score 550 as computed by verification module 150.

Now turning to FIG. 6a, an exemplary graphical user interface (GUI) available through a browser 172 of access device 170 is disclosed. In one implementation, the browser 172 includes an application interface 600 that includes a plurality of columns for viewing of a list of event detected clusters pertaining to channels 602. Within each channel are the event detected clusters relating to the topic of the channel.

In one implementation, in the FIG. 6a example, there may be channel 602a for "newest" and another channel 602b for "trending". However, although only two channels are presented on the application interface 600 to the user in this example, there may be n number of channels displayed on the application interface 600. The default channels provided by the application interface 600 allow the user to be notified of events that might be new or trending without having to search by key terms.

In another implementation, continuing onto FIG. 6b, a user through the browser 172 of access device 170 may enter a search term in search field 601 to tailor the application interface 600 to their needs. The UI module 232 of Event Processing Server 210 will then retrieve any event detected clusters matching the user's search term from the generated cluster datastore 244. The results are rendered by the UI module 232 and presented to the user through browser 172 under channel 602a of program interface 600, with the channel representing the search term. As shown in FIG. 6b example, channel 602c representing the search term "GOP" and channel 602d for "Democrats" may be presented for viewing.

In one implementation, the indication 604 provided before the text of the event detected cluster depicts the number of unit data in the event detected cluster. In a further implementation, there may be additional designation 605 indicating the event detected cluster importance based on the topic to a professional consumer (e.g. topic relating to crises, conflicts (political or geopolitical) or criminal activity).

In a further implementation, the event detected cluster may also be presented with the topic 606 as determined by topic categorization module 131; categories 608 which may be customized terms; summary 616 as determined by summarization module 132. The event detected cluster may also contain concepts 610, which are the markables from the unit data that formed the event detected cluster, as determined by organization module 126.

The event detected cluster may further be presented with the hashtags 612 used in the ingested data as detected by the organization module 126, newsworthiness indication 618 as determined by newsworthiness module 133. In one implementation, newsworthiness indication 618 might be depicted as a filled in star.

The event detected cluster may also be presented with veracity score 614 as determined by verification module 150. In one implementation, the veracity score may be in the form of filled-in circles indicative of the strength of the veracity determination, with 5 solid circles as near accurate.

In yet another implementation, the user may select create new channel 620 based on concepts in an event detected cluster. The newly created channel is based on identified concepts 610.

Figure 6C:
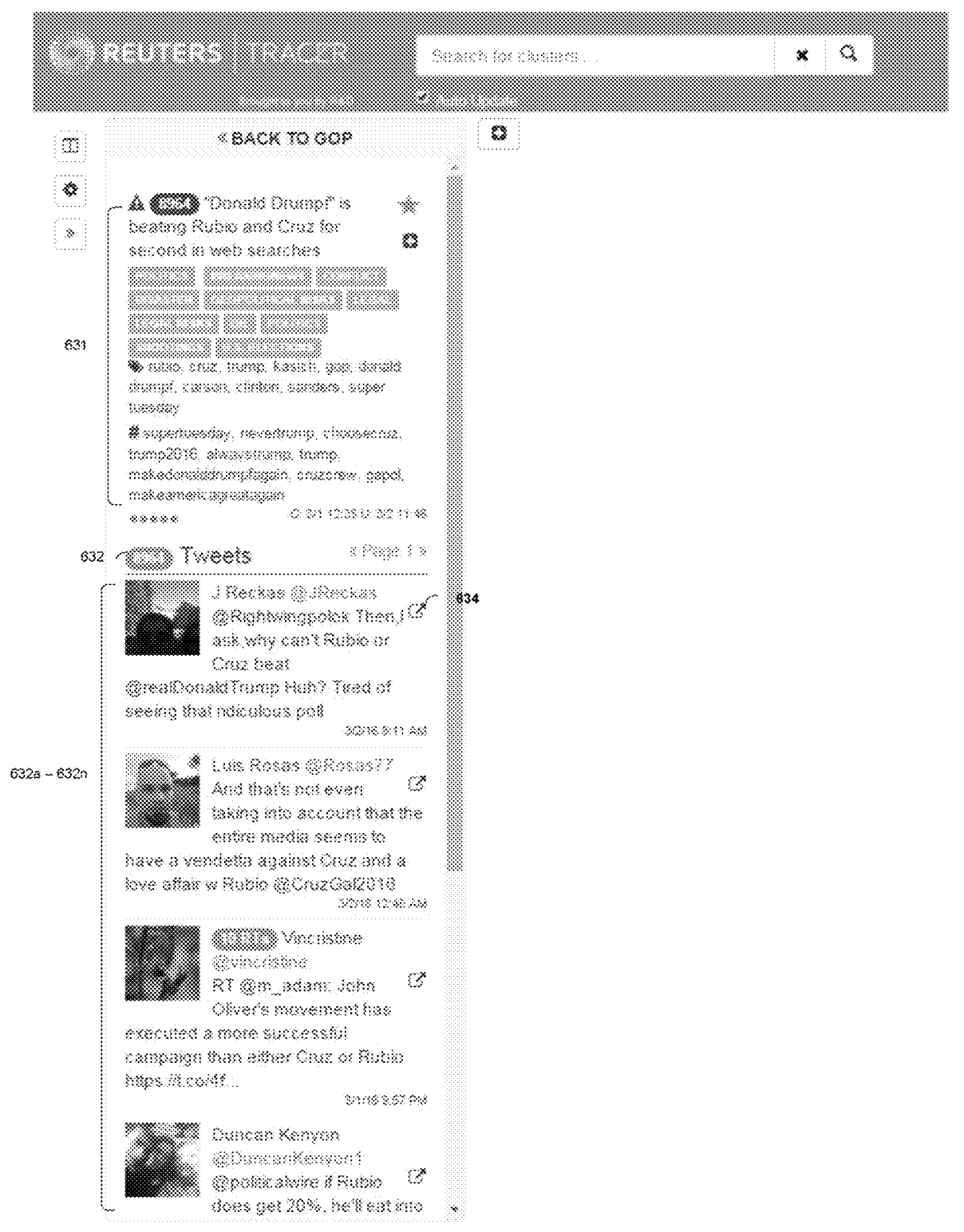

Using the critical event detected cluster as an example, the selection of the cluster is illustrated in FIG. 6c. The set of unit data 632a-632n corresponding to the selected event detected cluster 631 is presented. In a further implementation, the user may utilize link 634 to view a specific unit data.

Returning back to FIG. 6b, in another implementation, channel options 622 allows for filtering of the event detected cluster results presented by UI module 232 onto browser 172 of the access device 170. The UI module 232 receives the filter designation as selected by the user in the application interface 600 and processes the request in accordance with the filters illustrated in relation to FIG. 7a-7e.

Figure 7A:
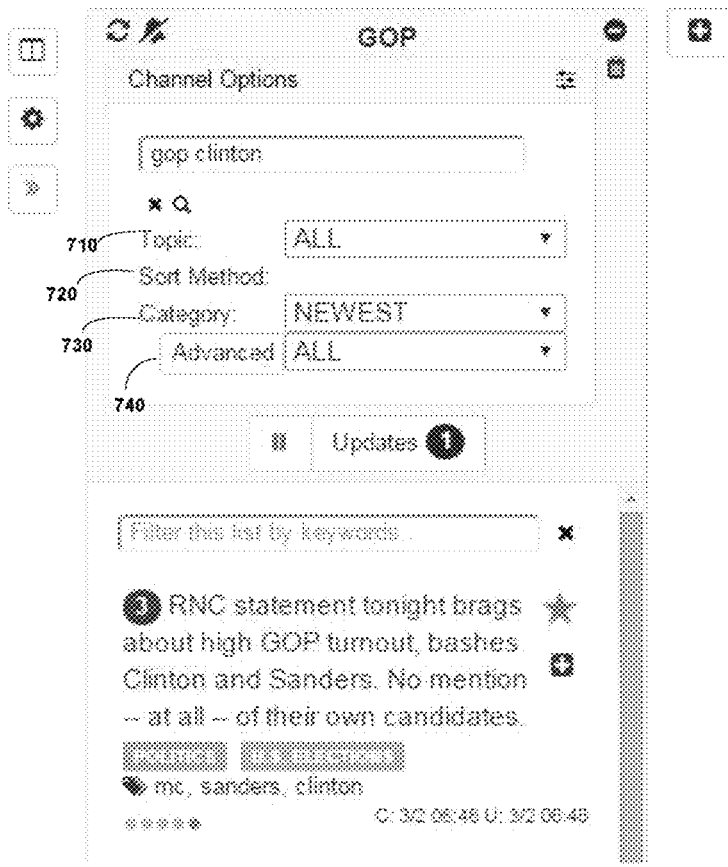
FIG. 7a-7e illustrate additional filters on event detected clusters available through an exemplary graphical user interface (GUI).

In one implementation, as shown in FIG. 7a, filtering is available based on topic 710, sort method 720, category 730 and advance 740 filtering.

Figure 7B:
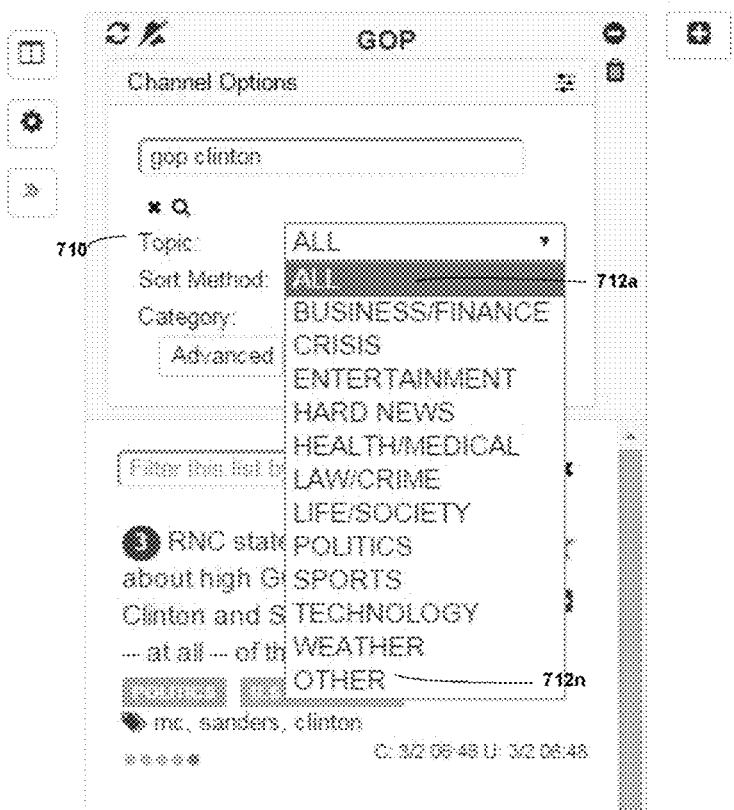

FIG. 7b illustrates an exemplary topic filter 710. The topic filter 710 contains list of topic filters 712a-712n. They may be, but not limited to, topics pertaining to: business/finance, crisis, entertainment, hard news, health/medical, law/crime, life/society, politics, sports, technology, weather, or other as identified by the topic categorization module 131.

Figure 7C:
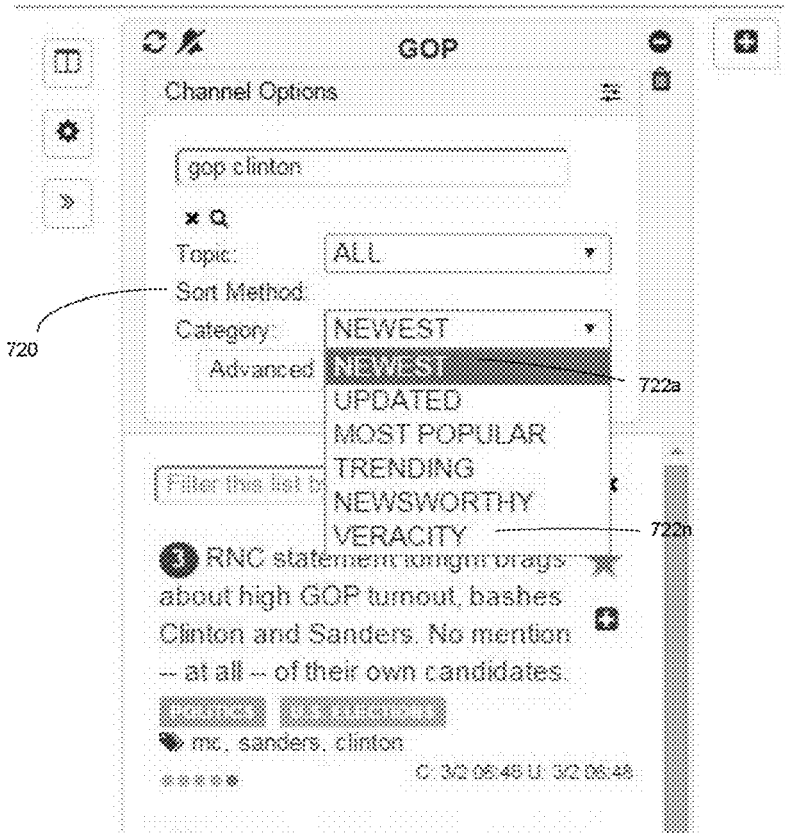

FIG. 7c illustrates an exemplary sort filter 720. The sort filter 720 contains options 722a-722n and they may be but are not limited to sorting by: newest, updated, most popular, tending, newsworthy, and veracity.

Figure 7D:

FIG. 7d illustrates an exemplary category filter 730. The category filter 730 contains a list of category filters 732a-732n. The category options may be but are not limited to: breaking news, conflict, disaster, dow, financial risks, geopolitical risks, legal, legal risks, markets, oil, politics, shootings, U.S. elections.

Figure 7E:
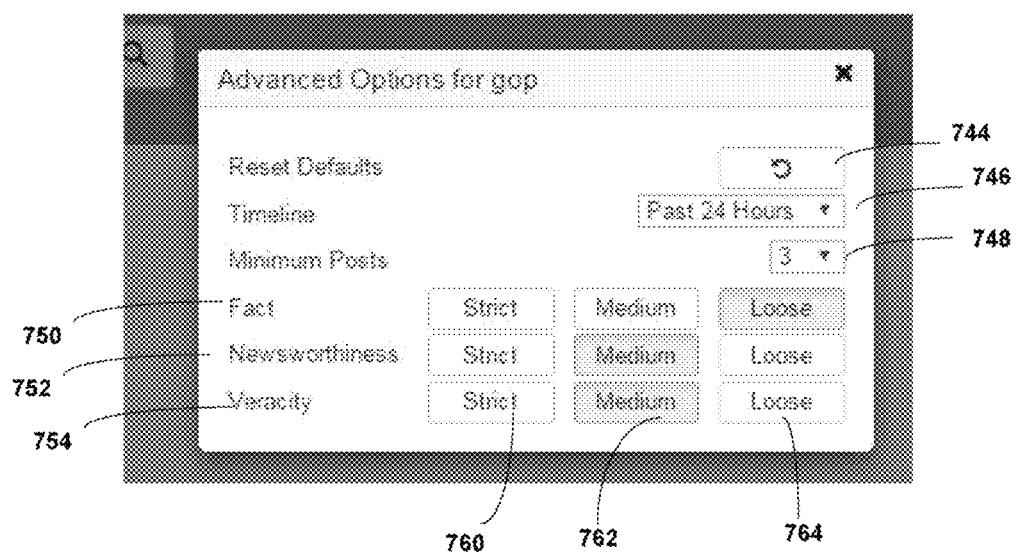

FIG. 7e are the advanced options upon selection of advance 740 on application interface 600. In one implementation, the advance options for the selected channel may be, reset defaults 744, timeline 746 with a time frame selection, minimum posts 748 count, and three levels of strict 760, medium 762 or loose 764 for fact 750, newsworthiness 752 and veracity 754.

FIGS. 1 through 7e are conceptual illustrations allowing for an explanation of the present disclosure. Various features of the system may be implemented in hardware, software, or a combination of hardware and software. For example, some features of the system may be implemented in one or more computer programs executing on programmable computer. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Cross-Media Event Detection and Coreferencing

Figure 8:
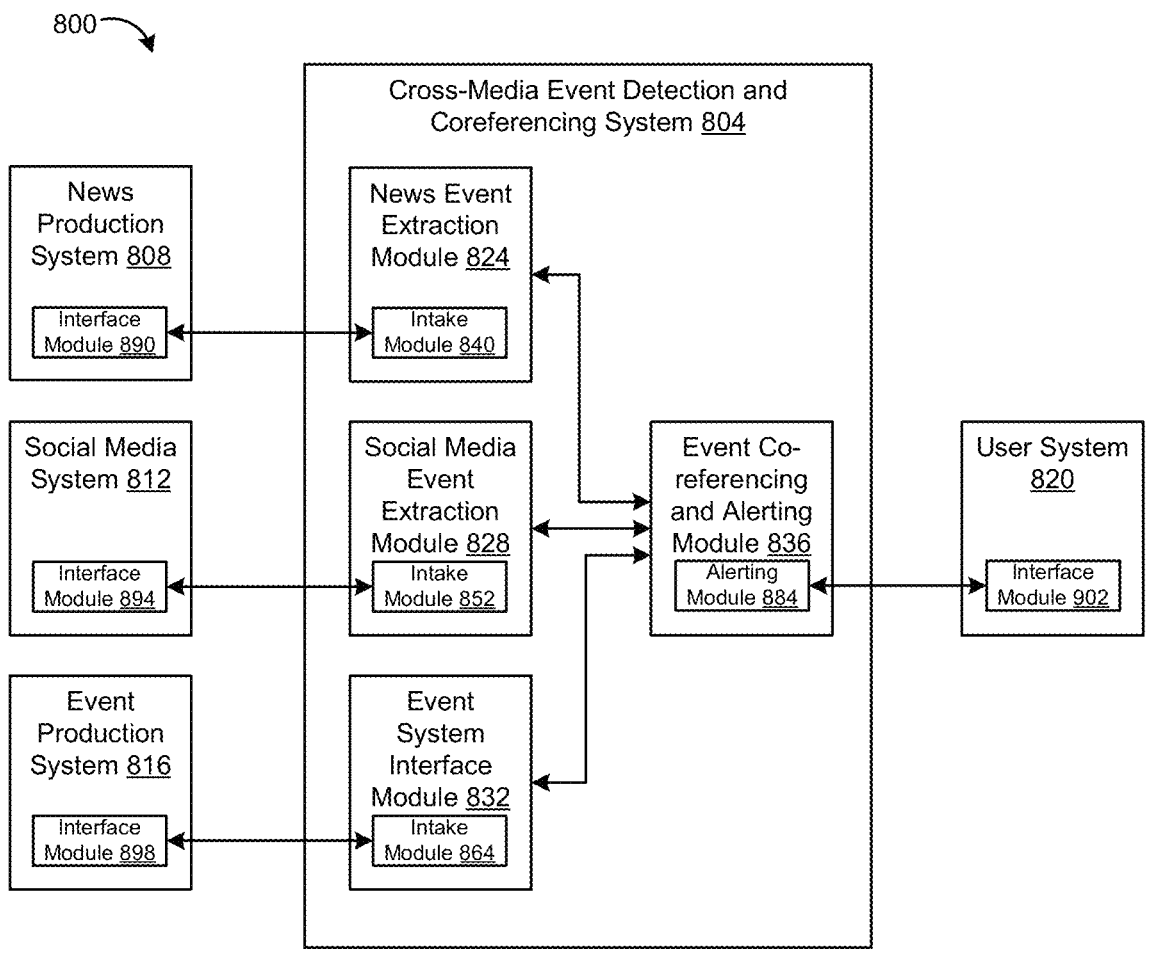
FIG. 8 is a schematic diagram depicting an embodiment of a system for detecting and coreferencing events across media types.

FIG. 8 depicts an embodiment of a system 800 for detecting and coreferencing events across media types, the system 800 including a cross-media event detection and coreferencing system 804, a news production system 808, a social media system 812, an event production system 816, and a user system 820.

The cross-media event detection and coreferencing system 804 includes a news event extraction module 824, a social media event extraction module 828, an event system interface module 832, and an event coreferencing and alerting module 836.

The news event extraction module 824 intakes a stream of news articles from the news production system 808, detects and extracts information about events referenced by the news articles, and generates and stores representations of the events. The news production system 808 may be any system that produces news articles, such as a newspaper system or online service, news content system or online service, etc.

The social media event extraction module 828 intakes a stream of social media postings from the social media system 812, detects and extracts information about events referenced by the postings, and generates and stores representations of the events. The social media system 812 may be any social media platform that produces social media postings, such as Twitter, Facebook, Instagram, etc.

An optional event system interface module 832 intakes a stream of event information from the event production system 816, and stores representations of the events. The event production system 816 may be any system that produces event information, such as scientific systems that directly produce weather data, earthquake data, tsunami data, etc.

The event coreferencing and alerting module 836 receives the representations of events generated by the news and social media event extraction modules 824, 828, determines whether any of the news articles and social media postings reference the same event, i.e., coreference the event, and generates and stores a coreferenced event representation for any such coreferenced events. In embodiments including the event system interface module 832, the event coreferencing and alerting module 836 also receives the event representations from the event system interface module 832, and integrate these into its event coreferencing. The event coreferencing and alerting module 836 further generates and outputs alerts for coreferenced events to the user system 820, for use in decision making and/or system control by the user and/or user system 820.

The user system 820 may be any system used by a user, such as an individual, organizational, or governmental entity, etc., to receive coreferenced event alerting from the cross-media event detection and coreferencing system 804.

The cross-media event detection and coreferencing system 804 thus detects, extracts and provides coreferenced event representations for events referenced across different media types, including both news articles and social media, and therefore greatly improves the quality of generated event information by combining aspects of different media types, including the ubiquitous coverage of social media and the reliability and context of news articles, which provides a correspondingly improved basis for decision making and/or control by users and user systems 820.

In embodiments, a system for detecting and coreferencing events across media types may include only any subset of, or an alternative connection or ordering of, the features depicted in or discussed herein in regard to FIG. 8.

Figure 9:
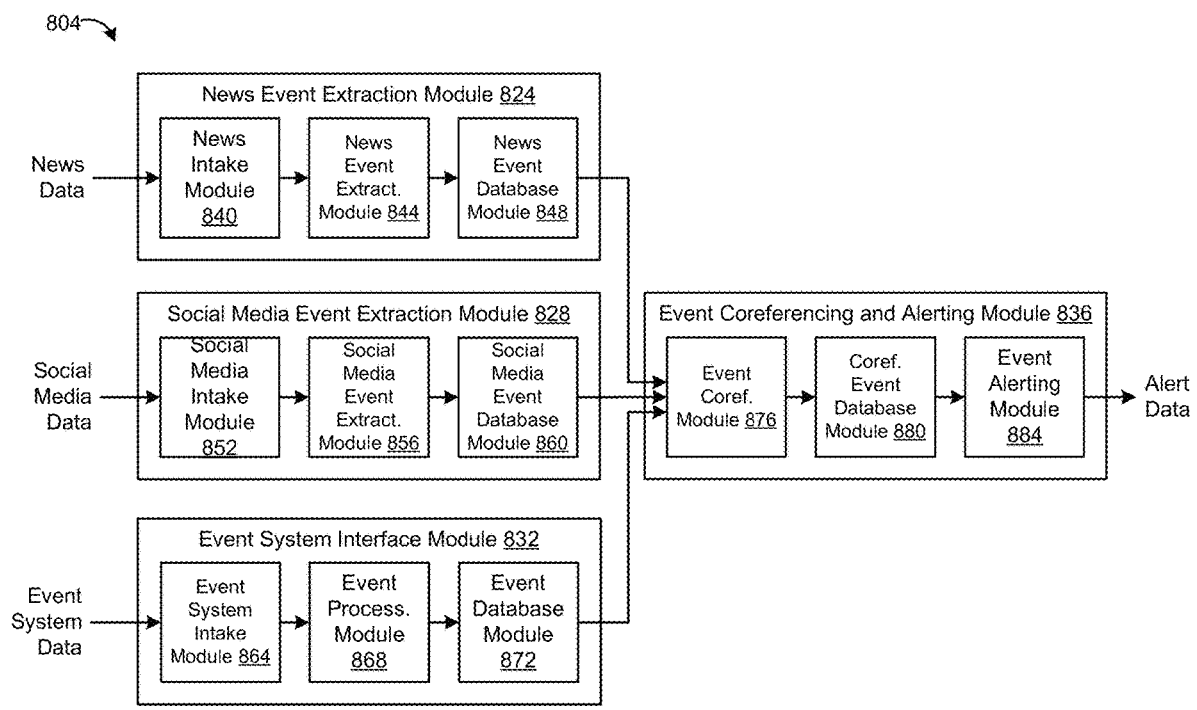
FIG. 9 is a schematic diagram depicting an embodiment of a cross-media event detection and coreferencing system.

FIG. 9 depicts an embodiment of the cross-media event detection and coreferencing system 804, showing embodiments of the news event extraction module 824, social media event extraction module 828, event system interface module 832, and event coreferencing and alerting module 836 in more detail.

The news event extraction module 824 includes a news intake module 840, a news event extraction module 844, and a news event database module 848. The news intake module 840 retrieves a stream of news articles from the news production system 808. The news event extraction module 844 detects events referenced by the news articles, extracts information about the detected events, and generates an event representation including attributes of the event based on the extracted information. The news event database module 848 stores the generated event representations.

The social media event extraction module 828 includes a social media intake module 852, a social media event extraction module 856, and a social media event database module 860. The social media intake module 852 retrieves a stream of social media postings from the social media system 812. The social media event extraction module 856 detects events referenced by the social media postings, extracts information about the detected events, and generates an event representation including attributes of the event based on the extracted information. The social media event database module 860 stores the generated event representations.

The event system interface module 832 includes an event system intake module 864, an event system processing module 868, and an event database module 872. The event system intake module 864 retrieves a stream of event information from the event production system 816. The event processing module 868 processes the received event information to generate event representations including attributes of the events based on the event information. The event database module 872 stores the generated event representations.

The event coreferencing and alerting module 836 includes an event coreferencing module 876, a coreferenced event database module 880, and an event alerting module 884. The event coreferencing module 876 retrieves the event representations stored for the stream of news articles and for the stream of social media postings, determines whether any news article and social media posting references a same event, and generates a coreferenced event representation for such a coreferenced event. In embodiments also intaking externally generated event information from the event production system 816, the event coreferencing module 876 also retrieves the event representations stored from the retrieved external event information, determines whether any news article, social media posting and external event information reference a same event, and generates a coreferenced event representation for such a coreferenced event. The coreferenced event database module 880 stores the generated coreferenced event representations. The event alerting module 884 provides an alert to the user system 820 including coreferenced event representations, for use by the user or user system in decision making and/or system control.

In embodiments, a cross-media event detection and coreferencing system may include only any subset of, or an alternative connection or ordering of, the features depicted in or discussed herein in regard to FIG. 9.

Figure 10:
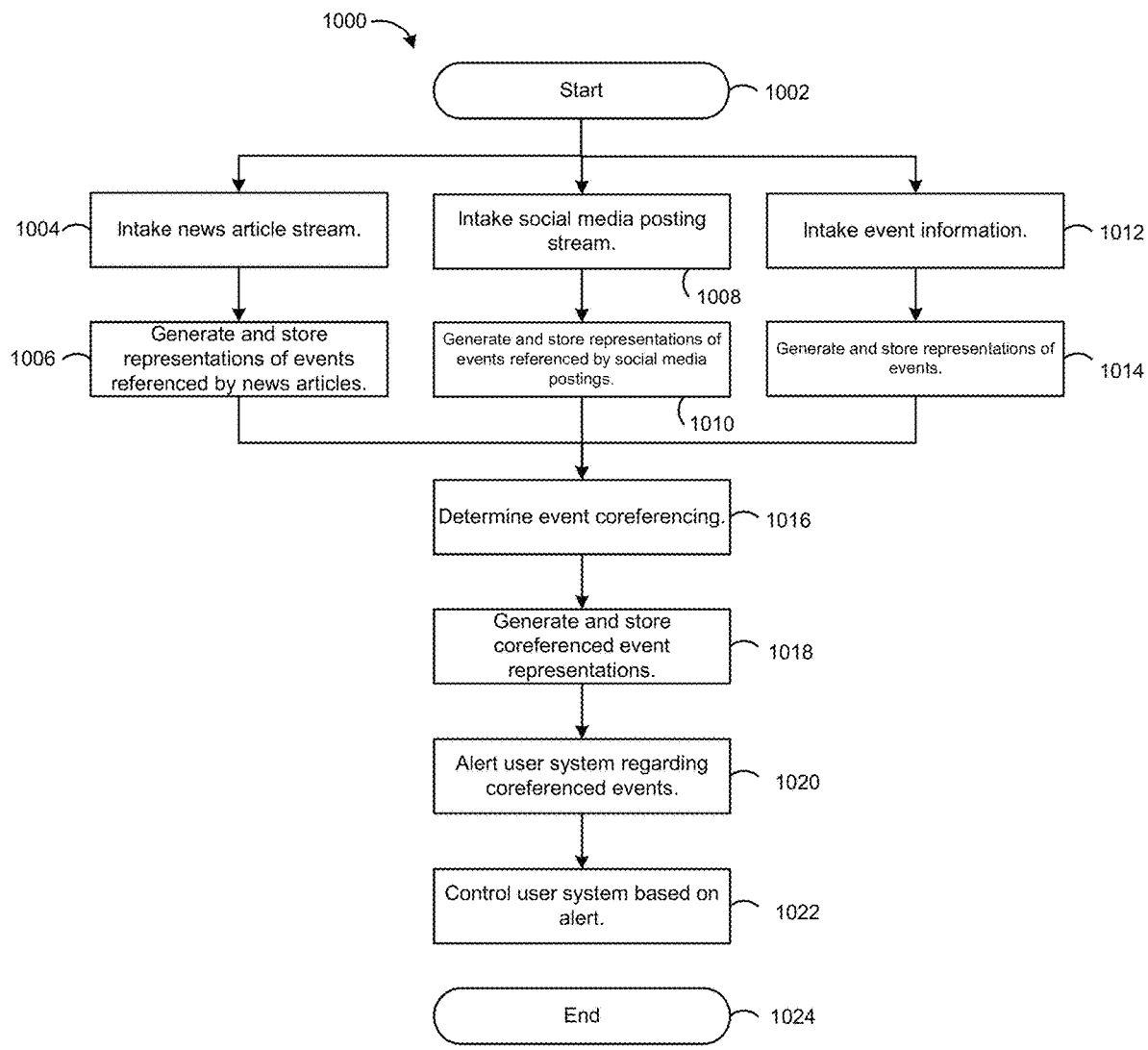
FIG. 10 is a flowchart depicting an embodiment of a method of detecting and coreferencing events across media types.

FIG. 10 depicts an embodiment of a method 1000 of detecting and coreferencing events across media types. The method may be performed by or involving components of the system 800 for detecting and coreferencing events across media types of FIG. 8, such as by embodiments of the cross-media event detection and coreferencing system 804 of FIG. 9. The method detects, extracts and provides to the user system 820 alerts with coreferenced event representations for events referenced by both news articles and social media. The method thus greatly improves the quality of generated event information by combining aspects of different media types, including the ubiquitous coverage of social media and the reliability and context of news articles. The method also thus provides a correspondingly improved basis for decision making and/or control by the user and/or user system 804. The method begins at step 1002.

At step 1004, a stream of news articles is retrieved. The stream of news articles may be retrieved by the news article intake module 840, such as by communicating over one or more communication networks with an interface module 890 of the news production system 808. For example, the news article intake module 840 may generate and transmit over the communication network one or more requests to the interface module 890 of the news production system 808, which may be an application programming interface (API), and receive from the interface module 890 one or more transmissions over the communication network including the stream of social media postings in response. At step 1006, event representations for events referenced by the news articles are generated and stored. The event representations may be generated by the news event extraction module 844, such as discussed in more detail below. The generated event representations may be stored by the news event database module 848.

In parallel with the news article intake and event representation generation, at step 1008, a stream of social media postings are retrieved. The stream of social media postings may be retrieved by the social media intake module 852, such as by communicating over one or more communication networks with an interface module 894 of the social media system 812. For example, the social media intake module 852 may generate and transmit over the communication network one or more requests for the interface module 894 of the social media system 812, which may be an API, and receive from the interface module 894 one or more transmissions over the communication network including the stream of social media postings in response. At step 1010, event representations for events referenced by the social media postings are generated and stored. The event representations may be generated by the social media event extraction module 856, such as discussed in more detail below. The generated event representations may be stored by the social media event database module 860.

Also in parallel with the other intake and event representation generation, at step 1012, a stream of externally generated event information is retrieved. The stream of externally generated event information may be retrieved by the event system intake module 832, such as by communicating over one or more communication networks with an interface module 898 of the event production system 816. For example, the event system intake module 864 may be configured to receive a feed of event information from the interface module 898 of the event production system 816, which may be an API. At step 1014, event representations corresponding to the externally generated event information are generated and stored. The event representations may be generated by the event processing module 868. The generated event representations may be stored by the event database module 872.

Although FIG. 9 separately depicts the news event database module 848, social media event database module 860, event database module 872, and coreferenced event database module 880, in embodiments these modules may be implemented using either separate databases or a single database.

At step 1016, it is determined whether any of the news article and social media postings reference a same event. A news article and a social media posting referencing a same event is referrend to herein as the news article and a social media posting coreferencing the event, and the event is referred to herein as a coreferenced event. Event coreferencing is determined by the event coreferencing module 876, such as discussed in more detail below. At step 1018, coreferenced event representations are generated and stored for determined coreferenced events. The coreferenced event representations are generated by the event coreferencing module 876, and stored by the event database module 880.

At step 1020, alerts regarding any corefernced events are provided. The alerts may be provided by the event alerting module 884, such as by communicating over one or more communication networks with an interface module 902 of the user system 820. For example, the alerting module 884 may generate and transmit over the communication network one or more alert emails, text messages, feed items, API messages, etc. containing the coreferenced event representations to the interface module 902 of the user system 820.

In embodiments, the alerting module 884 may receive a transmission from the interface module 902 of the user system 820 containing one or more criteria defining what types of alerts are to be provided to the user system 820, such as defining the type, location, time, etc., of events, and the alerts transmitted by the alerting module 884 may containing information for correspondingly selected coreferenced events.

At step 1022, the user and/or user system 820 performs control of components of the user system 820 based on the received alert. The type of control performed will generally depend upon the type of user system 820. For manufacturing and other business-operations user systems, manufacturing, supply chain management, or other business-operations action may be performed based on the alert. For example, a manufacturing system may contain a control component that performs supply chain management control, such as scheduling or routing supply chain deliveries, in response to an alert regarding an event in a region also containing a manufacturing plant. For financial trading user systems, a trading action may be performed based on the alert. For example, a financial trading system may contain a control component that performs trading, such as selling or buying financial commodities, in response to an alert regarding an event affecting a business stance of an organization. Other types of control are also possible. The method ends at step 1024.

In embodiments, a method of detecting and co-referencing events across media types may include only any subset of, or an alternative ordering of, the features depicted in or discussed above in regard to FIG. 10.

The event representations generated by the event detection and coreferencing system 804 provide a number of functionalities, including for storage by the event detection and coreferencing system 804, for use in comparing events by the event detection and coreferencing system 804, and for use to perform decision making and system control based on events in the user system 820.

The event representations may include one or more attributes defining the event. In exemplary embodiments of the event detection and co-referencing system 804 discussed herein, event representations include an event type, an event location, an event time, and an event impact. In other examples, event representations may include one or more of the who, what, where, when, why and how of the event (i.e., who was involved in the event, what type of event was it and/or what type of human and/or material impact did it have, where did the event occur, when did the event occur, why did the event occur, and how did the event occur), or variations thereof. Other embodiments may use other event attributes for event representations.

The event representations also may include one or more of the news article and/or social media posting referencing the event, or links thereto. For example, an event representation generated for an event referenced by a news articled may include the news article or a link to the news article. An event representation generated for an event referenced by a social media posting or cluster of social media postings may include the social media postings or cluster of social media postings or a link or links thereto. An event representation generated for an event coreferenced by both a news article and a social media posting or cluster of social media postings may include the news article, the social media postings or cluster of social media postings, a link or links thereto, or any combination thereof.

Figure 11:
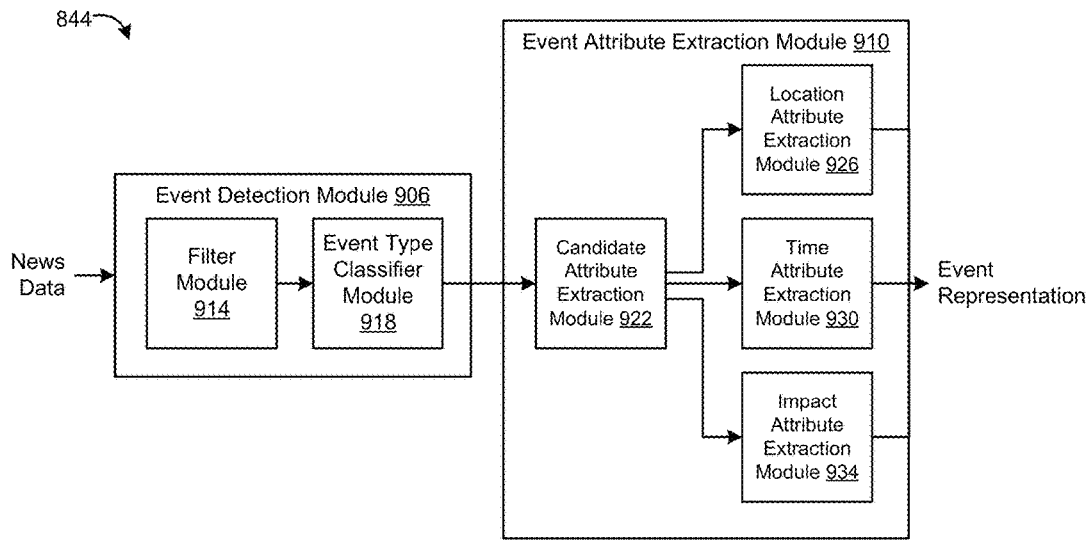
FIG. 11 is a schematic diagram depicting an embodiment of a news event extraction module.

FIG. 11 depicts an embodiment of the news event extraction module 824, including an event detection module 906 and an event attribute extraction module 910.

The event detection module 906 detects events, and corresponding event types, referenced by the retrieved news articles. The event detection module 906 includes a filter module 914 and an event classifier module 918. The filter module 914 removes non-event related news articles from the stream of news articles. The event classifier module 918 classifies the type of event referenced by the remaining articles.

The event attribute extraction module 910 extracts further information about the detected events, and generates an event representation including attributes of the event based on the extracted information. The event attribute extraction module 910 includes a candidate attribute extraction module 922, a location attribute extraction module 926, a time attribute extraction module 930, and an impact attribute extraction module 934. The candidate attribute extraction module 922 processes the news article to generate candidate event attributes. The location attribute extraction module 926 generates a location attribute for the event using the candidate attributes. The time attribute extraction module 930 generates a time attribute for the event using the candidate attributes. The impact attribute extraction module 934 generates an impact attribute for the event using the candidate attributes.

In embodiments, a news event extraction module may include only any subset of, or an alternative connection or ordering of, the features depicted in or discussed herein in regard to FIG. 11.

Figure 12:
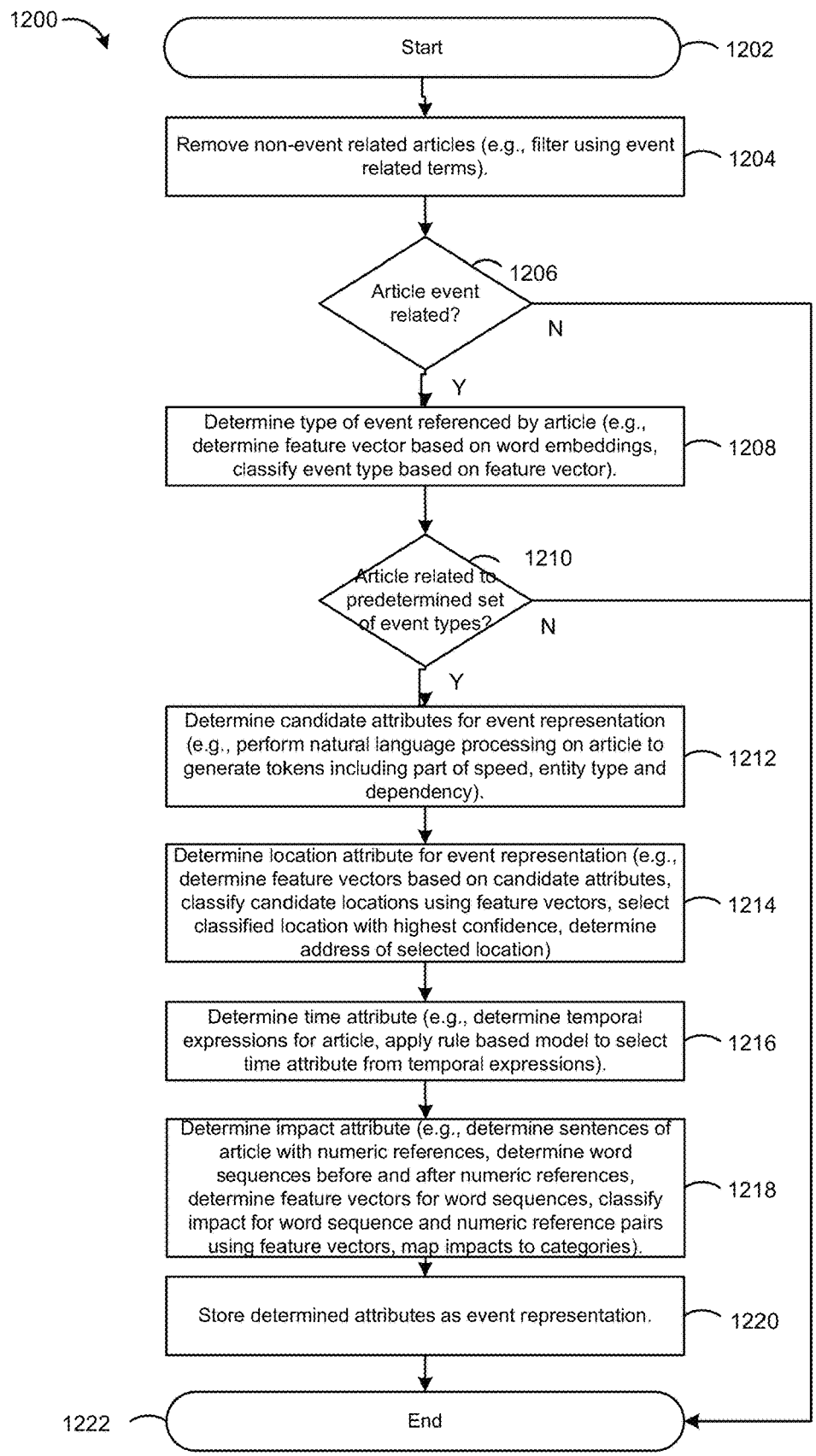
FIG. 12 is a flowchart depicting an embodiment of a method of detecting and generating representations of events referenced by news articles.

FIG. 12 depicts an embodiment of a method 1200 of detecting and generating an representation of events referenced by news articles. Embodiments of the method of FIG. 12 may be used to perform the event representation generation and storage step 1006 of the method 1000 of FIG. 10. The method may be performed by or involving components of the event detection and coreferencing system 804, such as by or involving components of the news event extraction module 844 of FIG. 11. The method processes each of the retrieved stream of news articles to detect whether the article references an event of a predetermined set of event types, and, if so, generates a representation of the event referenced by the article. The method may operate on the stream of news articles in real time to provide a corresponding stream of detected and generated event representations. The method may be performed for each article in the stream. The method begins at step 1202.

At step 1204, a filtering may be performed to remove articles not related to events. The filtering may be performed by comparing the article to a set of key words related to events, and if the article does not have any of the key words, deeming the article to be non-event related, and if it has any of the key words, deeming it to be event related.

At step 1206, if in step 1204 the article is deemed to be not event-related, the method proceeds to step 1222, where the method ends, but if in step 1204 the article is deemed to be event-related, the method proceeds to step 1208.

At step 1208, the type of event referenced by the article is determined. The determination may be performed using supervised machine learning, including composing a feature vector based on the news article, inputting the vector to a classifier, and the classifier predicting that the news article is one of a predetermined set of event types, or none of these event types, based on the vector. The predetermined set of event types may be selected to include types of events that will be useful for the user system to have knowledge of. For example, for a user system focused on events relevant to manufacturing, finance, security, policy, governance, planning and disaster coordination, in embodiments the event types may include: conflict, fire, flood, infrastructure breakdown, labour unavailability, storms, terrorism. That is, the classifier predicts a discrete class label yi, where yi∈{'conflict', 'fire', 'flood', 'infrastructure breakdown', 'labour unavailability', 'storms', 'terrorism', 'none'}, for a given news article xi. Different types of classifiers may be used, such as Support Vector Machine (SVM), Random Forest, Convolution Neural Network, Hierarchical Attention Network, etc. An SVM-based approach may provide particularly good results. The input feature vector may be composed to include word embeddings for words of the news article. The word embeddings may be customized by training a word embedding model using a combination of data sources, such as a filtered English Wikipedia dump and tokens extracted from news articles tagged with disaster or accident topic codes, allowing the model to capture the semantic structure of event-related news.

At step 1210, if at step 1208 the article is classified as related to none of the predetermined set of event types, the method proceeds to step 1222, where the method ends, but if at step 1208 the article is classified as related to one of the predetermined set of event types, the event type attribute for the event is selected as the predicted event type, and the method proceeds to step 1212.

At step 1212, the article is processed to extract candidates for remaining attributes of the event representation. The processing may include natural language processing the article to split the raw text into tokens based on morphological aspects of the text, and also provide additional information for each token, such as a part-of-speech tag, a named entity type, and a dependency tree, and using these determined enriched tokens as candidate attributes. For example, mentions of entity types such as locations, dates, numerals etc. in the text, provides a set of candidate event attributes that efficiently narrows down the search space for extracting the true event attributes such as the event location, event time and event impact. The generated enriched tokens also provide leverage in the further stages of the news event extraction module. For example, the part-of-speech tags capture the syntactic structure around the words, while the dependency trees can resolve structural ambiguity.

At step 1214, the location attribute is determined. The location attribute may be determined by classifying locations of the candidate attributes. For example, the classification may be performed using supervised machine learning, such as SVM, including for each candidate location composing a feature vector, inputting the vector to a classifier, the classifier predicting whether or not that candidate location is the event location with an associated confidence level, and selecting the candidate location predicted as the event location with the highest confidence as the event location attribute. The determination of the location attribute may also include determining geographical coordinates of the selected location.

The location attribute may be organized using a four-level hierarchy: country as level 0; first administrative area (e.g., state, province, etc.) as level 1; second administrative area (e.g. county, department, etc.) as level 2; and localities (e.g. city, towns, villages, etc.) as level 3.

The feature vector for each candidate location may be composed based on the news article and candidate attributes. For example, feature vector for each candidate location may be composed as a concatenation of the following: (1) a vector representing an average of the word embedding vectors corresponding to the sentence in which the candidate location is present; (2) a binary vector whose dimensions correspond to the possible entity types, with the value at each dimension set to 1 only if the entity type appears in the surrounding k tokens of the candidate location (e.g., for k=5); (3) a binary vector whose dimensions correspond to the possible part-of-speech tags, with the value at each dimension is set similar to above; (4) a position offset of the candidate location in the news article; (5) a 4-dimensional binary vector that encodes the location representation in the four-level hierarchy; and (6) a binary value which is set to 1 if the article contains another location that is more specific (i.e., has a higher lever in the taxonomy) than the candidate location. The last two components of the feature vector encode the geographical taxonomy while the rest of the features capture the syntactic and semantic context.

As indicated above, the determination of the location attribute may also include determining geographical coordinates of the selected location. A problem to address may be location ambiguity: several distinct locations may have the same name. For example, if the event location is identified as "Naples", it may be important to disambiguate whether the location referred is "Naples, Italy" or "Naples, Fla. (US)" or "Naples, Ill. (US)". The ambiguity in the event location may be resolved based on spatial proximity clues. It is assumed that all the candidate locations are likely to be near to each other (hence to the event location). When the event location is ambiguous, all potential addresses for the selected event location are compared with the remaining candidate locations to disambiguate it. That is, a geocoder is queried to retrieve all the potential addresses corresponding to all candidate locations. Each address is arranged in the four-level hierarchy described above. For each potential address of the event location we compute a score that is the linear combination of an overlap score and a popularity score. The overlap score is computed by summing the height of the common subtrees between the potential event location address and all other candidate locations addresses. The popularity score is returned by the geocoder and is calculated using frequency-based statistics over Wikipedia articles. Finally, the address with the maximum score is selected and the corresponding geographical coordinates are used as the coordinates of the location attribute.

At step 1216, the time attribute is determined. The time attribute may be determined by using a rule-based model to select one of the temporal expressions of the candidate attributes as the time attribute for the event. For example, a rule-based model may select as the time attribute the first occurring temporal expression in the article text. The following four types of temporal expressions may be considered: absolute values (e.g. 12-March), explicit offsets (e.g. yesterday), implicit offsets (e.g. Thursday) and positional offsets (e.g. last week). An exception to the above rule of the rule-based model may be when the following two conditions are simultaneously true: (1) the news article began with an absolute value (usually the publication date/time) and (2) the first sentence of the news article contains multiple temporal expressions. In such a case, the rule-based model may ignore the first absolute value and select the second temporal expression as the time attribute of the event. The time attribute may be composed as a date and time. Generating the time attribute may include converting the selected temporal expression to a canonical form, with the publication timestamp of the article used to resolve offsets (e.g, yesterday, last week).

At step 1218, the impact attribute is determined. The impact of an event may include one or more of a human impact (e.g., how were humans impacted), a material impact (e.g., how were material things such as structures, goods, financial quantities, etc. impacted), etc. For example, an impact attribute may indicate one or more of: a number of human casualties, a number of humans relocated, or an amount of financial damages. Typically, the impact of large-scale events is expressed in quantifiable units in association with an effect (e.g., ten people injured, 15 drowned). The impact attribute may be determined by classifying numeric references of the candidate attributes and adjacent word sequences as either representing an impact of the event or not. For example, for each sentence of the article that contained tokens with a cardinal number part-of-speech tag, that numeric value is considered as a putative unit of human impact (e.g., ten, 15). The vicinity of this value in the text is then searched for word sequences that may describe the effect (e.g., injured, drowned), with putative effect word sequences generated by constructing all n-grams, e.g., where $1<=n<5$, from each side of the cardinal token within the sentence. For each word sequence, a feature vector is generated as a concatenation of: (1) an average embedding vector corresponding to the word sequence, (2) a length of the word sequence (n), (3) a pre and post token offset of the cardinal number token, relative to the word sequence, (4) a binary vector corresponding to one part-of-speech tag for each word in the word sequence, (5) a binary vector corresponding to the entity types of the word sequence, and (6) a binary vector corresponding to the dependency tree relations of the word sequence. Each generated pair of numeric value and feature vector for a word sequence is then input to a classifier, such as an SVM classifier, and the classifier classifies the input numeric value and word sequence as either indicating a human impact or not. The determined impacts may be mapped into broad categories such as dead, injured, missing and displaced. The mapped impacts predicted by the classifier may be selected as the impact attribute. In the case of multiple predicted impacts, the impact attribute may include all of the predicted impacts, or a single or predetermined number of impacts may be selected as the impact attribute, such as the impacts predicted with the highest confidence.

At step 1220, the event representation, including the determined event attributes, for the event referenced by the news article is stored. The event representation may be stored by the news event database module 848. As discussed above, the stored event representation also may include the news article itself, or a link to the news article.

In embodiments, a method of a method of detecting and generating a representation of events referenced by news articles may include only any subset of, or an alternative ordering of, the features depicted in or discussed above in regard to FIG. 12.

Figures 13A, 13B, 13C:
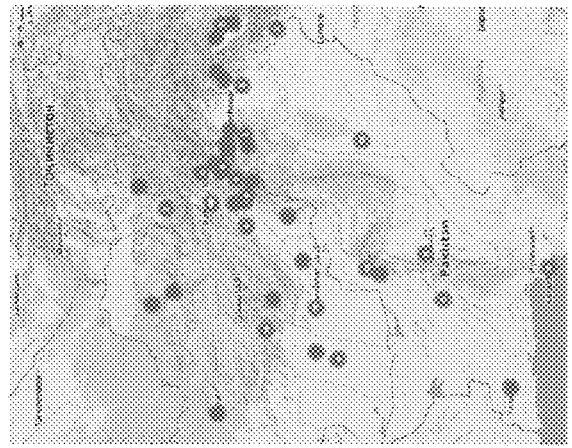
FIGS. 13A-13C depict embodiments of news articles, social media postings and corresponding generated event representations for events that are coreferenced by the depicted news articles and social media postings.
Figures 13D, 13E, 13F:
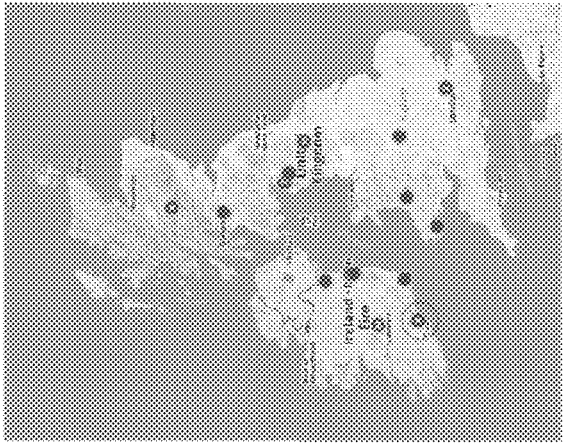
FIGS. 13D-13F depict embodiments of displays of coreferenced events of the event types in FIGS. 13A-13C, respectively, detected for a predetermined time period.

FIGS. 13A-13C depict embodiments of news articles and social media postings from the month of October 2017 that an embodiment of the cross-media event detection and coreferencing system 804 determined coreference the same events. FIG. 13A depicts in the top half of the figure a news article that references an event related to the wildfires that affected California, and a corresponding event representation extracted by the event detection and coreferencing system 804 having a fire event type. FIG. 13B depicts in the top half of the figure a news article that references an event related to the Hurricane Ophelia storms in Ireland and United Kingdom, and a corresponding event representation extracted by the event detection and coreferencing system 804 having a storm event type. FIG. 13C depicts in the top half of the figure a news article that references an event related to armed conflicts in Afghanistan, and a corresponding event representation extracted by the event detection and coreferencing system 804 having a conflict event type. FIGS. 13D-13F depict embodiments of a display of coreferenced events of the event types in FIGS. 13A-13C, respectively, detected by embodiments of the event detection and coreferencing system 804 for the first three weeks of October 2017, shown as points on a map having the coordinates of the coreferenced event representations.

Figure 14:
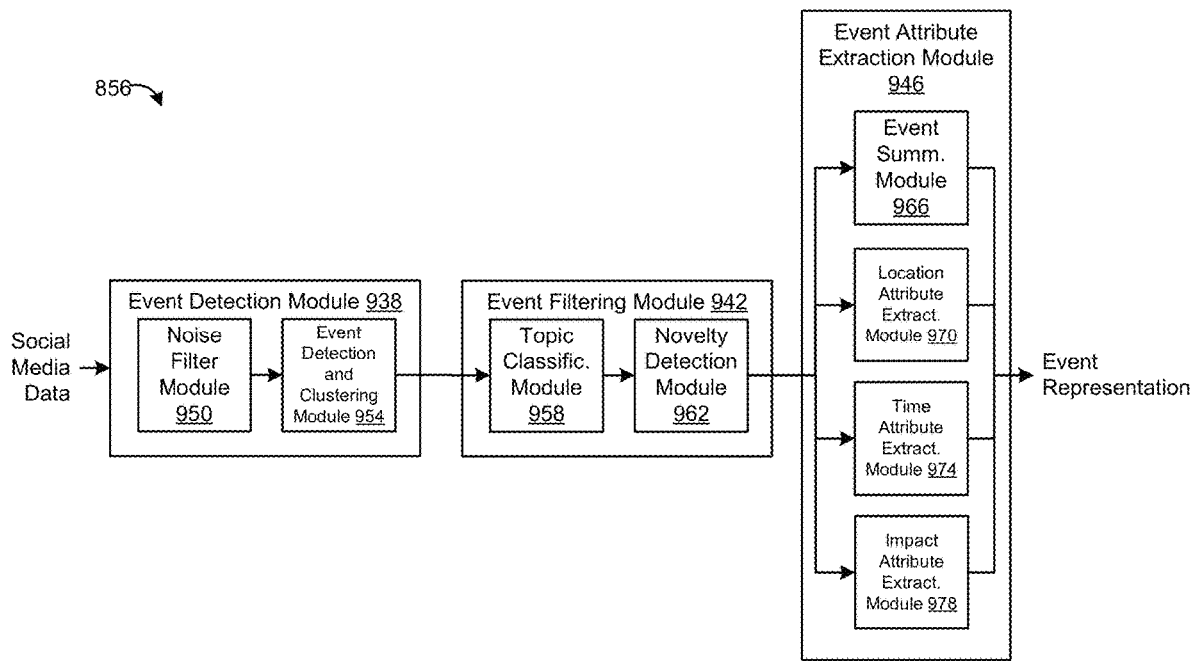
FIG. 14 is a schematic diagram depicting an embodiment of a social media event extraction module.

FIG. 14 depicts an embodiment of the social media event extraction module 856, including an event detection module 938, an event filtering module 942, and an event attribute extraction module 946.

The event detection module 938 detects events referenced by the retrieved social media postings, and clusters social media postings that reference the same event. The event detection module 938 includes a noise filter module 950 and an event detection and clustering module 954. The noise filter module 950 removes non-event related social media postings from the stream of social media postings. The event detection and clustering module 954 detects events in the social media postings, and clusters social media postings that reference a same event.

The event filtering module 942 removes social media clusters that are not related to events of predetermined event types, such as newsworthy events, and that are not related to current events. The event filtering module 942 includes a topic classification module 958 and a novelty detection module 962. The topic classification module 958 classifies the type of event referenced by the social media cluster. The novelty detection module 962 determines whether the event referenced by the social media cluster is a current event.

The event attribute extraction module 946 extracts further information about the detected events, and generates an event representation including attributes of the event based on the extracted information. The event attribute extraction module 946 includes an event summarization module 966, a location attribute extraction module 970, a time attribute extraction module 974, and an impact attribute extraction module 978. The event summarization module 966 produces a summary of the social media cluster. The location attribute extraction module 970 generates a location attribute for the event referenced by the social media cluster. The time attribute extraction module 974 generates a time attribute for the event referenced by the social media cluster. The impact attribute extraction module 978 generates an impact attribute for the event referenced by the social media cluster.

In embodiments, a social media event extraction module may include only any subset of, or an alternative connection or ordering of, the features depicted in or discussed herein in regard to FIG. 14.

In embodiments, the social media event extraction module 856 may instead be, or be composed of components of, the system 100 for detecting and verifying an event from social media data. For example, the social media event extraction module 856 may include components of the system 100 that perform the event detection and extraction functionalities discussed herein with respect to the embodiment of the social media event extraction module of FIG. 14, method of detecting and generating an representation of events referenced by social media postings of FIG. 15, or subsets or combinations of the features thereof.

In embodiments, the social media event extraction module 856 may include any combination the components and/or features of the embodiment of the social media event extraction module of FIG. 14 and the embodiment of the system 100 for detecting and verifying an event from social media data of FIG. 1, or any combination of any subset of, or connection or ordering of, such components and/or features.

Figure 15:
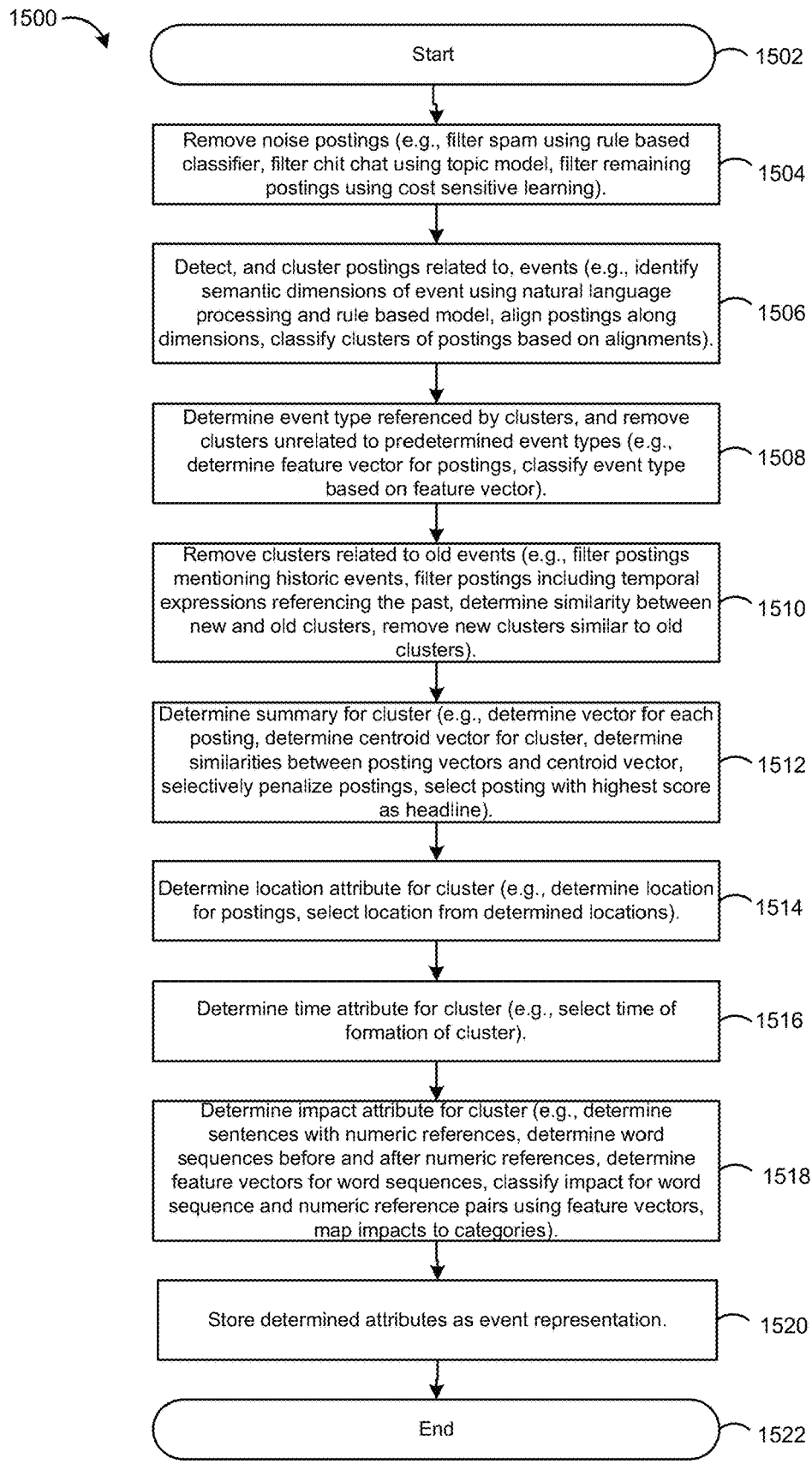
FIG. 15 is a flowchart depicting an embodiment of a method of detecting and generating representations of events referenced by social media postings.

FIG. 15 depicts an embodiment of a method 1500 of detecting and generating a representation of events referenced by social media postings. Embodiments of the method of FIG. 15 may be used to perform the event representation generation and storage step 1010 of the method 1000 of FIG. 10. The method may be performed by or involving components of the event detection and coreferencing system 804, such as by or involving components of the social media event extraction module 856 of FIG. 14. The method processes the retrieved stream of social media postings to detect whether the postings reference events of a predetermined set of event types, clusters postings that refer to the same event, and generates representations of the referenced events. The method may operate on the stream of social media postings in real time to provide a corresponding stream of detected and generated event representations. The method begins at step 1502.

At step 1504, the social media postings are filtered to remove postings not related to events. Postings not related to an event may be considered to be noise, and may include spam, such as advertisements and bot-generated content, and daily chit-chat. In the Twitter universe, for example, the signal-to-noise ratio is very small, with only a tiny minority of about 0.2% of Tweets discussing news events. The filtering of the social media posting may include applying an iterative set of filters to the postings to remove the noise. First, a rule-based classifier is used to filter suspicious spam users or messages from certain domains such as ebay.com. Second, a topic model is used to identify and filter out chit-chat. The model is trained on two corpora of online conversations that are unrelated to news. Third, cost-sensitive learning is used to filter the remaining postings. Since the signal-to-noise ratio is very small, the model is tuned to penalize false positives, so that messages that may have some valuable content in them are not filtered.

At step 1506, event detection and clustering is performed on the remaining social media postings. The event detection and clustering detects events referenced by the social media postings, and groups into a cluster, or collection, postings that refer to the same event. For example, the postings may be processed using natural language processing to identify attributes of a referenced event. For this purpose, an event may be conceptualized as a semantic entity with four main dimensions: what, where, who, and when. A natural language processing tool may be used to identify the first three dimensions, if present, in each posting. A rule-based model that identifies explicit or implicit expressions of time such as "on Monday," "this morning," or "1926" may be used to identify the fourth dimension. Next, a soft-matching process is used to align postings along each dimension, and a linear classifier, trained on the interpolation of these dimensions to group postings around real-world events, is used to group into clusters postings that refer to the same event. The result is a cache of clusters, where each cluster consists of postings that discuss a particular event. This identifies events dynamically and in real-time, and if a cluster forms around an event, as new postings emerge about the same event, they can be dynamically added to the cluster.

At step 1508, the type of event referenced by the social media cluster is classified. The event type classification may be performed similarly to as for the news event type classification. For example, the event referenced by the clusters may be classified by determining a feature vector for one or more postings of the cluster, providing the feature vector as an input to a classifier, and predicting by the classifier whether the posting references one of a predetermined set of event types, or none of these event types, based on the vector. The feature vector may include word embeddings for words of the social media postings of the social media cluster.

For example, in one embodiment, step 1508 may be performed as follows. First, we induce a Latent Dirichlet Allocation (LDA) model on 500 million postings, setting k=300 as the number of desired topics, and producing 300 topic distributions. Next, we train a skip-gram model to jointly predict the word as well as its topic, representing each tweet by a two-hot vector (one representing the word's index in the dictionary and another representing its topic). That is, the two-hot vector comprises the concatenation of two individual vectors in one-hot encoding, the first of which constituting a redundant encoding of the word itself (where the k-th bit set to 1 means the word is the k-th word in the lexicon and all other bits are set to 0), and the second of which is the topic. The resulting 600-dimensional embeddings are used as features for a Sequential Minimal Optimization (SMO) Support Vector Machine (SVM) model to predict the topic. It is trained on a set of 26,300 postings using n+1 topics, including the topic model induced as described above modified to include a new catch-all topic (the n+1st) to capture tweets that do not fall under any of the target topics. Tweets predicted as the catch-all rejection class can be removed.

At step 1510, clusters not related to current events are removed. Current events may be defined as events occurring within a predetermined time period from a current time of the real time processing of the social media stream. To remove clusters not related to current events, a hybrid approach may be utilized. First, clusters are analyzed for expressions of time, with clusters having expressions of time referencing a time period before a time period of current events being removed. For example, postings that explicitly mention a historical event such as WWII or 9/11 are removed by a taxonomy-based filter, and postings that mention an expression of time such as "last week" are removed by another filter. Secondly, a similarity score may be calculated for newly formed clusters relative to previously formed clusters, with newly formed clusters similar to previously formed clusters to within a predetermined degree being regarded as mere updates on the event of the previous cluster, and thus also removed. For example, a pairwise similarity score may be calculated between a newly formed cluster and every other cluster in the cache, and if the incoming cluster closely resembles an older one to a predetermined degree based on the score, it is likely to be an update on an event that is previously reported, and these residual updates are ignored and the new cluster removed.

At step 1512, a summary of each cluster is determined for inclusion in the event representation for that cluster. The summary may be generated as a selected one of the postings in the cluster that may be most representative, objective, and/or informative. For example, given a cluster, each posting is treated as a document and represented by a tf-idf vector. Each cluster is then represented by a centroid vector. Each posting vector is then scored based on its similarity to the centroid. A rule-based approach is utilized to penalize tweets that include opinionated terms or patterns such as repeated characters or punctuation. The posting with the highest score is selected as the summary.

At step 1514, a location attribute of the event referenced by the social media cluster is determined. Since social media postings may have a character limit, the number of locations mentioned in them is often limited. For example, more than 60% of tweets in one dataset mention a single location, and fewer than 2% have more than three locations in them. The location attribute may be selected for the cluster using a rule-based approach. If multiple locations are mentioned but some are included within others, the less granular locations are ignored. If the remaining pool of locations includes more than one location, it is handled based on the nature of the event. For example, floods can span multiple locations but terror attacks are often limited to one. In cases when the event is limited to one location, the location mentioned last in the tweet is selected. This is based on the observation that in most cases, the last location mentioned in the tweet is the primary location of the event (e.g. in "Six Islamic State leaders escaping Hawija killed in Diyala."). Using this approach, each posting generates one location for the cluster. The location for the cluster is selected using a voting system to select from among the locations selected for the postings of the cluster. Additionally, a least-common-distance metric may be used to disambiguate toponyms such as "Paris" that can be mapped to multiple coordinates around the word.

At step 1516, a time attribute for the event referenced by the social media cluster is determined. For social media clusters, the timestamp of the realtime formation of the cluster by the social media event extraction module 828 may be selected as the time attribute. For clusters including only a single social media posting, the timestamp of the posting may be selected as the time attribute.

At step 1518, an impact attribute for the event referenced by the social media cluster is determined. The impact attribute may be selected as done for the news article in step 1218 of the method of FIG. 12, with the social media cluster or postings of the cluster being analyzed instead of a news article. Each of the postings of a cluster may be analyzed to determine impacts, or a single or predetermined number of representative posting of the cluster, such as the posting used for the summary, may be analyzed to determine impact.

At step 1520, the event representation, including the determined event attributes, for the event referenced by the social media cluster is stored. The event representation may be stored by the social media event database module 860. As discussed above, the stored event representation also may include the some or all of the social media postings of the social media cluster, or a link or links thereto. The method ends at step 1522.

In embodiments, a method of a method of detecting and generating an representation of events referenced by social media postings may include only any subset of, or an alternative ordering of, the features depicted in or discussed above in regard to FIG. 15.

Returning to FIGS. 13A-13C, FIG. 13A depicts in the bottom half of the figure a cluster of social media postings that references the event related to the wildfires that affected California, and a corresponding extracted event representation; FIG. 13B depicts in the bottom half of the figure a cluster of social media postings that references the event related to the Hurricane Ophelia storms in Ireland and United Kingdom, and a corresponding extracted event representation; and FIG. 13C depicts in the bottom half of the figure a cluster of social media postings that references the event related to armed conflicts in Afghanistan, and a corresponding extracted event representation.

Figure 16:
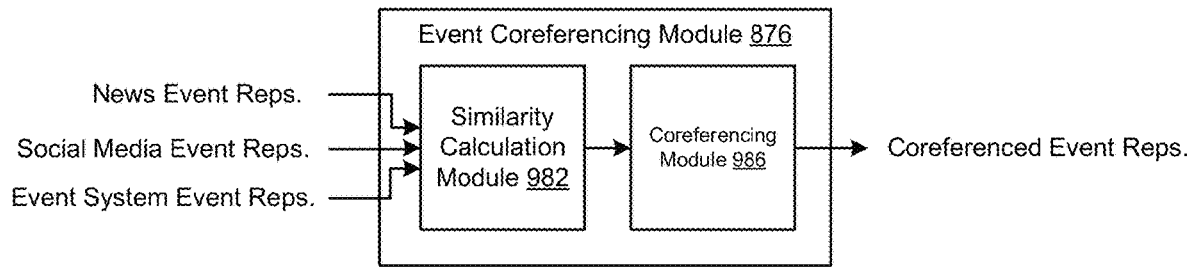
FIG. 16 is a schematic diagram depicting an embodiment of an event coreferencing module.

FIG. 16 depicts an embodiment of the event coreferencing module 876, including a similarity calculation module 982 and a coreferencing module 986.

The similarity calculation module 982 receives the event representations generated for the stream of news articles and for the stream of social media postings, and determines one or more similarity measures between the news article event representations and the social media event representations. The coreferencing module 986 receives the determined similarity measures, and determines whether any news articles and social media clusters retrieved from corresponding streams within a predetermined timeframe, anchored back from the current time, reference the same event, i.e., coreference the event.

In embodiments, an event coreferencing module may include only any subset of, or an alternative connection or ordering of, the features depicted in or discussed herein in regard to FIG. 16.

Figure 17:
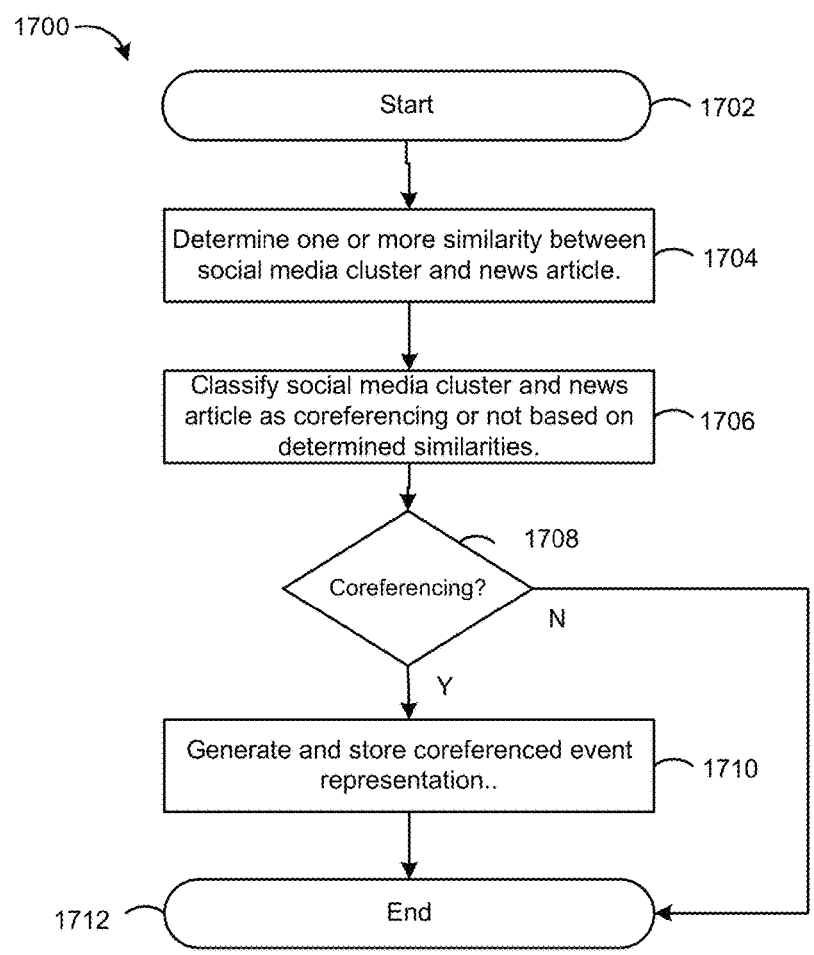
FIG. 17 is flowchart depicting an embodiment of a method of determining event coreferencing across media types.

FIG. 17 depicts an embodiment of a method 170 of determining event coreferencing across media types. Embodiments of the method of FIG. 17 may be used to perform the event coreferencing and coreferenced event representation generation and storage of steps 1016 and 1018 of the method 1000 of FIG. 10. The method may be performed by or involving components of the event detection and coreferencing system 804, such as the event coreferencing module 876 of FIG. 16. The method determines one or more similarity measures between a given pair of a news article and social media cluster, classifies the pair as coreferencing a same event or not based on the similarity measures, and for those pairs that coreference a same event, generates a coreferenced event representation for the coreferenced event. The method may operate on the streams of event representations produced from the streams of news articles and social media postings in real time to provide a corresponding stream of detected and generated coreferenced event representations. The steps of the method may be performed for each possible pair of news article and social media cluster generating event representations within a predetermined time window anchored back from the current time. The method thus greatly improves the quality of generated event information, by combining qualities of the different media types, including the ubiquitous coverage of social media and the reliability and context of news articles, to produce coreferenced event representations, which provides a correspondingly improved basis for decision making and/or control by the user and/or user system 820. The method begins at step 1702.

At step 1704, one or more similarity measure is determined between the news article, or the event representation for the news article, and the social media cluster, or the event representation for the social media cluster. The one or more similarity measures may be based on values of corresponding attributes of the event representation for the news article and the event representation for the social media cluster. For example, the one or more similarity measures may include one or more of a similarity measure based on a location attribute of the news article event representation and a location attribute of the social media event representation, or a similarity measure based on a time attribute of the news article event representation and a time attribute of the social media cluster event representation. The one or more similarity measures also may be based on the text of or information extracted from the news the news articles and social media clusters, such as candidate attributes, tokens, etc. For example, the one or more similarity measures may include one or more of a similarity measure based on a person or organization entity extracted from the news article and a person or organization entity extracted from the social media cluster, or a similarity measure based on a title or text of the news article and a text of the social media cluster.

At step 1706, a classification of whether a pair of a news article and a social media cluster coreference the same event is performed. The classification may be performed by composing a feature vector for the pair of the news article and social media cluster based on the determined one or more similarity measures between the news article and social media cluster, inputting the feature vector into a trained classifier, such as an SVM classifier, and the classifier then determining if the news article and social media cluster coreference the same event or not based on the input vector. The feature vector for the pair of the news article and social media cluster may be composed from the determined one or more similarity measures between the news article and social media cluster, such as by concatenating each of the determined one or more similarity measures into a vector.

At step 1708, if at step 1706, it is determined that the news article and social media cluster pair do not coreference the same event, the method proceeds to step 1712, where the method ends, but if at step 1706 it is determined that the news article and social media cluster pair coreference the same event, the method proceeds to step 1710, where an event representation for the coreferenced event is generated and stored. The coreferenced event representation may use the event representation of one or the other of the news article or social media cluster, or combine these event representations, such as where corresponding attributes of the event representation agree, using that attribute value, where corresponding attributes of the event representation do not fully agree, either selecting one or the other of the attribute values or using no value, and where one of the event representations includes an attribute value but the other does not, using that value or no value. The coreferenced event representation also may include the corresponding news article, social media cluster, a link or links thereto, or combinations thereof. The coreferenced event representation may be stored by the coreferenced event database module 880.

In embodiments, a method of determining event coreferencing across media types may include only any subset of, or an alternative ordering of, the features depicted in or discussed above in regard to FIG. 17.

Figure 18:
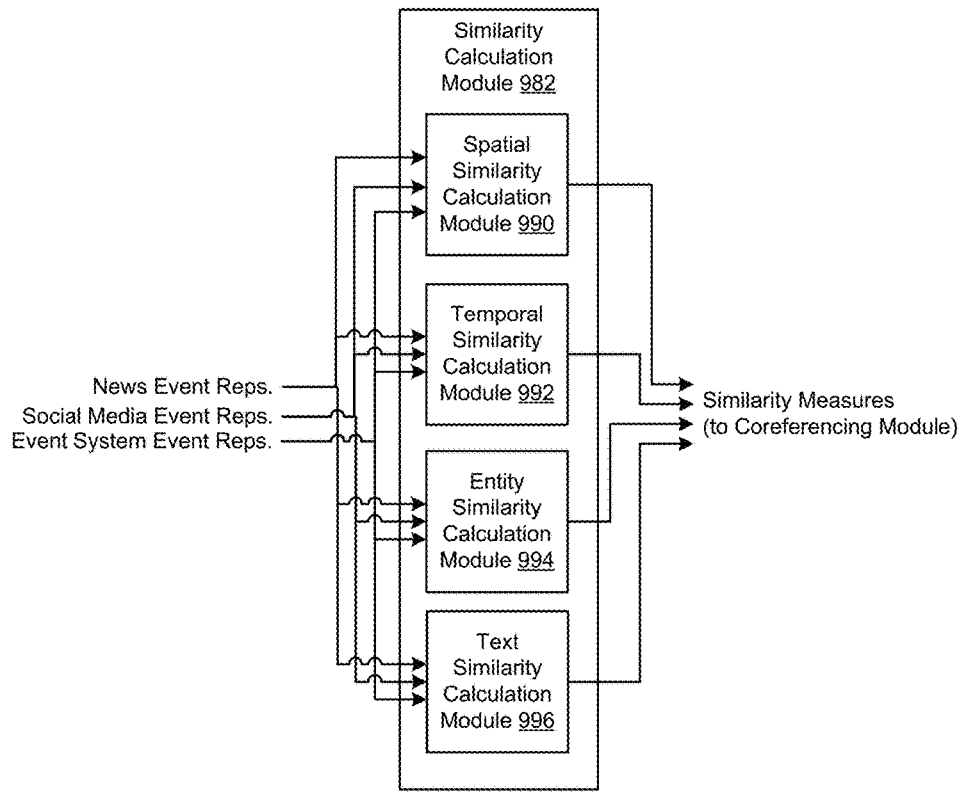
FIG. 18 is a schematic diagram depicting an embodiment of a similarity calculation module.

FIG. 18 depicts an embodiment of the similarity calculation module 982, including a spatial similarity calculation module 990, a temporal similarity calculation module 992, an entity similarity calculation module 994, and a text similarity calculation module 996. The spatial similarity calculation module 990 calculates a similarity based on the location attributes of the event representations of the news article and social media cluster. The temporal similarity calculation module 992 calculates a similarity based on the temporal attributes of the event representations of the news article and social media cluster. The entity similarity calculation module 994 calculates one or more similarities based on entities, such as persons or organizations, extracted from the news article and social media cluster. The text similarity calculation module 996 calculates a similarity based on text, such as the title or body, of the news article and the text of the social media cluster.

In embodiments, a similarity calculation module may include only any subset of, or an alternative connection or ordering of, the features depicted in or discussed herein in regard to FIG. 18.

Figure 19:
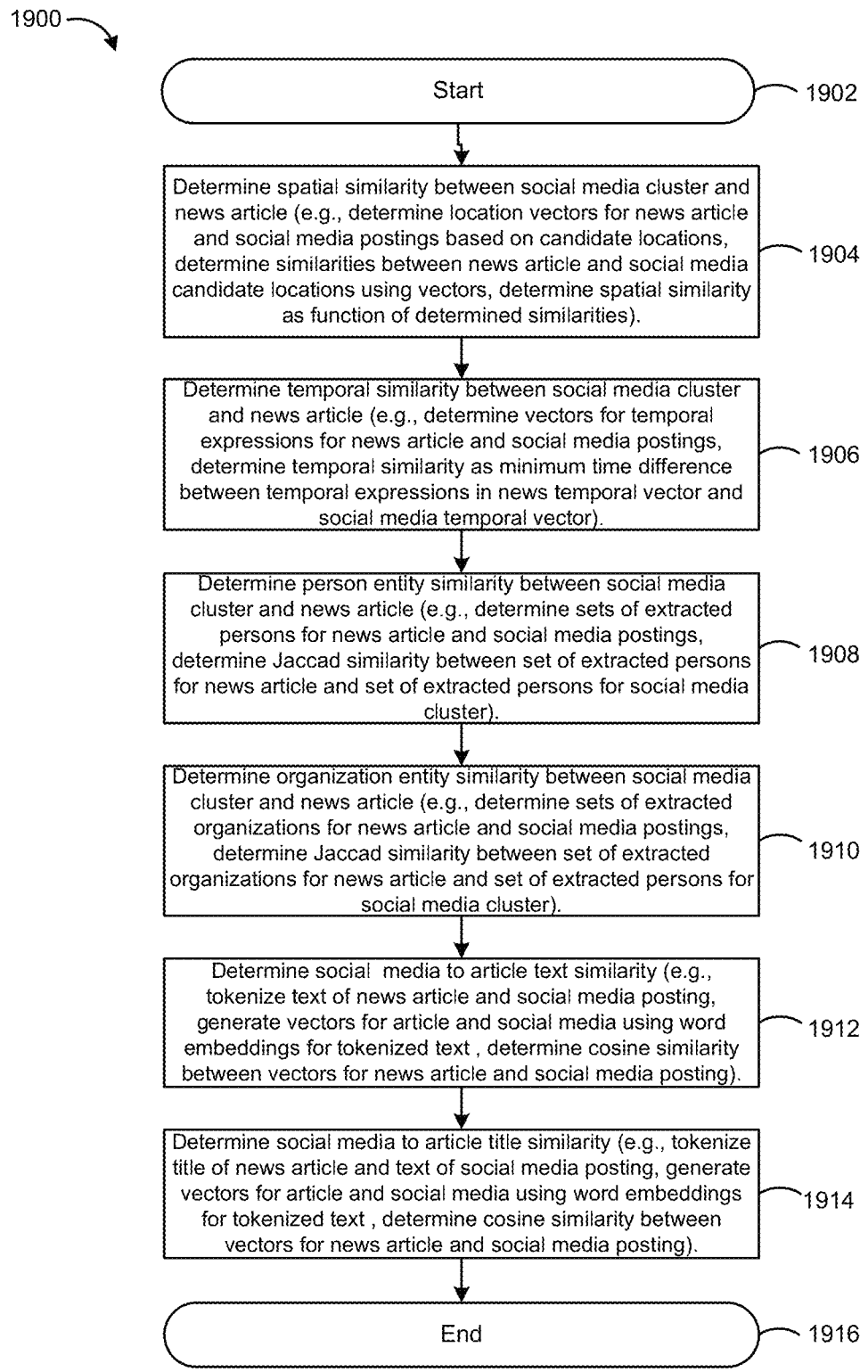
FIG. 19 is a flowchart depicting an embodiment of a method of calculating similarities between a news article and a social media cluster.

FIG. 19 depicts an embodiment of a method 1900 of calculating similarities between a news article and social media cluster. Embodiments of the method of FIG. 19 may be used to perform the similarity determining step 1704 of the method 1700 of FIG. 17. The method may be performed by or involving components of the event detection and coreferencing system 804, such as the similarity calculation module 984 of FIG. 18. The method begins at step 1902.

At step 1904, a spatial similarity $S_L$ between the news article and social media cluster is determined as a similarity based on locations of the event representations of and/or extracted from the news article and social media cluster. The determining of the spatial similarity $S_L$ may include determining feature vectors for the news article and the social media cluster based on the candidate locations extracted from the news article and the candidate locations extracted from the social media cluster, calculating similarities between each potential pair of such locations of the news article and the social media cluster using the feature vectors, and determining the spatial similarity $S_L$ as function of the determined candidate location similarities. For example, let X=[x1, x2, ..., xn] be the vector of all locations extracted from the news article rx, and let Y=[y1, y2, ..., ym] be a vector of all m locations extracted from a social media cluster ry. Using the geographical taxonomy to describe locations as discussed above, where a location is split into a four-level hierarchy, each location can be represented as a tree. A similarity between two locations x and y can be calculated based on the length of the common path, as follows:

$$\mu(x, y) = \frac{\lambda(x \cap y)}{\lambda(x) + \lambda(y)};$$

where $x \cap y$ is the maximum common subtree between x and y and $\lambda(x)$ is the height of tree x. For instance, the similarity between "Lyon" and "Paris" is ⅛, since these two cities share only the country (i.e., "France"), while the similarity between "Lyon" and "Grenoble" is ⅖, since these two cities additionally share the region (i.e., "Auvergne-Rhone-Alpes"). The spatial similarity $S_L$ between the news article and social media cluster can then be calculated based on the location vectors X and Y as:

$$S_L(X, Y) = \frac{\sum_{i=1}^{n} \max(\{\mu(x_i, y_j) \mid \forall y_j \in Y\}) + \sum_{i=1}^{n} \max(\{\mu(x_i, y_j) \mid \forall x_i \in X\})}{m+n}.$$

At step 1906, a temporal similarity $S_T$ between the news article and social media cluster is determined as a similarity based on the temporal attributes of the event representations of and/or temporal expressions extracted from the news article and social media cluster. The determining of the temporal similarity $S_T$ may include determining feature vectors of temporal expressions extracted from the news article and of temporal expressions extracted from the social media cluster, and determining the temporal similarity $S_T$ as the minimum time difference between temporal expressions in the news temporal vector and in the social media temporal vector. For example, let T=[t1, t2, ..., tz] be a vector of all z temporal expressions extracted from the news article rx, and let V=[v1, v2, ..., vw] be a vector of all w temporal expressions extracted from ry. The temporal similarity $S_T$ between the news article and social media cluster can then be calculated between two temporal vectors T and V as the minimum absolute time interval between temporal expressions in vector T and in vector V, as follows:

$$S_T(T,V) = \min(\{|t_i - v_j| \, \forall t_i \in T, v_j \in V\}).$$

At step 1908, a person entity similarity $S_P$ between the news article and social media cluster is determined. The determining of the person entity similarity $S_P$ may include determining sets of person entities extracted from the news article and the social media cluster using natural language processing on the news article and social media cluster, and determining a similarity, such as Jaccard similarity, between the sets of extracted persons for the news article and the social media cluster as the person entity similarity $S_P$.

At step 1910, an organization entity similarity $S_O$ between the news article and social media cluster is determined. The determining of the organization entity similarity $S_O$ may include determining sets of organization entities extracted from the news article and the social media cluster using natural language processing on the news article and social media cluster, and determining a similarity, such as Jaccard similarity, between the sets of extracted organizations for the news article and the social media cluster as the organization entity similarity $S_O$.

At step 1912, a text similarity $S_B$ between the body of the news article and one or more postings of the social media cluster is determined. The determining of the text similarity $S_B$ may include generating vectors for tokenized text of the news article and the social media posting based on word embeddings, and determining a similarity, such as a cosine similarity, between the determined vectors. For example, given a tokenized text $A=\{a1, \ldots, aq\}$ for the body of the text of the news article rx or the text of the social media posting ry, and a pre-trained word embedding model that maps each token ai to a word vector $\vec{W}_i$ for each of the news article and social media posting, the vector representing the text of the body of the news article or social media posting is computed as:

$$\vec{r}^{txt} = \frac{\sum A^{\vec{w}_i}}{|A|}.$$

The text similarity $S_B$ may be calculated as the cosine similarity between the vector $\vec{r}^{txt}$ for the news article and the vector $\vec{r}^{txt}$ for the social media posting. The text similarity may be determined for one or more postings of the cluster, such as a representative posting of the cluster, such as the posting used for the summary.

At step 1912, a text similarity $S_T$ between the title of the news article and one or more postings of the social media cluster is determined. The text similarity $S_T$ may be determined in the same way as for the similarity between the body of the news article and the posting, except the title of the news article is used instead of the body of the news article.

In embodiments, a method of a method of calculating one or more similarities between a news article and social media cluster may include only any subset of, or an alternative ordering of, the features depicted in or discussed above in regard to FIG. 19.

Returning to FIG. 17, for embodiments of the method 1700 using embodiments of the method 1900 of FIG. 19 to perform the determining of one or more similarities of step 1704, the classification at step 1706 of if the pair of news article and social media cluster coreference the same event or not may input a feature vector into a classifier composed as a concatenation of the similarities determined by the method 1900 as follows:

$$f_{r_x,r_y} = \{S_L, S_T, S_O, S_P, S_E, S_B\}.$$

Returning to FIGS. 13A-13F, as indicated above, FIGS. 13A-13C depict embodiments of news articles, social media postings, and corresponding event representations, for events that an embodiment of the cross-media event detection and coreferencing system 804 determined to be coreferenced by both the depicted news articles and social media postings, and FIGS. 13D-13F depict embodiments of a display of coreferenced events of the event types in FIGS. 13A-13C, respectively, detected by the embodiment of the cross-media event detection and coreferencing system 804 for a predetermined time period, shown as points on a map having the coordinates of the coreferenced event representations.

Embodiments of the cross-media event detection and coreferencing system 804, user system 820, news production system 808, social media system 812, and/or event production system 816, and/or any individual one or subset of these, and/or any individual one, subset, or all of the components of thereof, such as the news event extraction module 824, social media event extraction module 828, event system interface module 832, event coreferencing module 836, and/or components thereof, etc., may be implemented as hardware, software, or a mixture of hardware and software. For example, each of cross-media event detection and coreferencing system 804, user system 820, news production system 808, social media system 812, and/or event production system 816, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In exemplary embodiments, each of cross-media event detection and coreferencing system 804, user system 820, news production system 808, social media system 812, and/or event production system 816, and/or any individual one, subset, or all of the components thereof, may be implemented using one or more computer systems, such as, e.g., a mobile computing device, a desktop computer, laptop computer, network device, server, Internet server, cloud server, etc.

FIG. 20 depicts an embodiment of a computer system 1030 that may be used to implement any of cross-media event detection and coreferencing system 804, user system 820, news production system 808, social media system 812, and/or event production system 816, and/or any individual one, subset, or all of the components thereof. The computer system 1030 includes a processor 1034, a non-transitory machine-readable storage medium 1042, a communication circuit 1038, and optionally other components 1046. The processor 1034 executes program instructions stored in the non-transitory machine-readable storage medium 1042 to perform the functionality of the system or component that the computer system 1034 is implementing, as discussed herein. The communication circuit 1038 can be controlled by the processor 1034 to communicate with other devices, such as any other of the any of cross-media event detection and coreferencing system 804, user system 820, news production system 808, social media system 812, and/or event production system 816, to perform the functionality of the system or component that the computer system 1034 is implementing, as discussed herein. The optional other components 1046 may include any further components required by the computer system 1034 to perform this functionality.

In embodiments, a computer system that may be used to implement any of the cross-media event extraction and coreferencing system, user system, news production system, social media system, or event production system, and/or any individual one, subset, or all of the components thereof, may include only any subset of, or an alternative connection or ordering of, the features depicted in or discussed herein in regard to FIG. 20.

FIG. 21 depicts embodiments of the cross-media event detection and coreferencing system 804 and user system 820, showing further details of the event alerting module of the event detection and coreferencing system 804 and the interface module 902 and other components of the user system 820. In FIG. 21, for clarity of illustration, only component of the cross-media event detection and coreferencing system 804 and the user system 820 discussed further with respect to the figure are shown, and other components are omitted.

The event alerting module 884 may include an interface component including one or more of a publishing module 1050 or an API module 1054. The publishing module 1050 publishes alerts containing generated coreferenced event representations. The publishing module 1050 may publishes the alerts in a variety of ways, such as by transmitting emails containing the alerts to the user system 820, sending text messages containing the alerts to the user or user system 820, or providing a feed received by the user system 820 containing the alerts, etc. The API module 1054 implements an API that provides the alerts containing the generated coreferenced event representations. The API module 1054 may provide the alerts in a variety of ways, such as by transmitting responses to the user system 820 responsive to specific requests for alerts of the API module 1054 by the user system, by periodically transmitting alerts to the user system 820 based on established preferences for receiving alerts received by the API module 1054 from the user system 820, etc.

The user system 820 includes the interface module 902, a control module 1058, and other system components 1062. The interface module 902 interfaces with the event alerting module 884 over the one or more communication networks to receive the alerts, such as from the publication module 1050 or API module 1054, as discussed above.

The control module 1058 implements control of the user system 820 in response to the alerts, such as to implement the control of step 1022 of FIG. 10. The control module 1058 may include a standalone controller or processor, or may be implemented by a processor of a computer system implementing the control module 1058 and other components of the user system 820. The control module 1058 receives the alert and transmits control instructions to the other components 1062 of the user system 820 to implement control of these components 1062 based on the alert. The type of control and other components 1062 may depend on the context and uses of the user system. In one embodiment, the user system 820 is a supply chain management system for a manufacturing or other business organization, and the control module 1058 transmits a signal to a supply chain management module 1062 to control a supply chain, such as to schedule or reschedule a supply chain delivery, based upon the coreferenced event of the alert, such as an event near the manufacturing or business organization. In another embodiment, the user system 820 is a financial trading system, and the control module 1058 transmits a signal to a trading module 1062 to control trading of financial commodities, such as to buy or sell the financial commodities, based on the coreferenced event of the alert, such as an event affecting an organization related to the financial commodities. In another embodiment, the user system 820 is a manufacturing system, and the control module 1058 transmits a signal to a manufacturing module 1062 to control manufacturing activities, such as to suspend manufacturing activities, based on the coreferenced event of the alert, such as an event affecting an area of the manufacturing. Many other types of alert-based control are possible.

In embodiments, a cross-media event detection and coreferencing system 804 and user system may include only any subset of, or an alternative connection or ordering of, the features depicted in or discussed herein in regard to FIG. 21.

FIG. 22 depicts an embodiment of a method 2200 of providing an alert for a coreferenced event. Embodiments of the method of FIG. 22 may be used to perform the alerting of step 1020 of the method 1000 of FIG. 10. The method may be performed by or involving components of the event detection and coreferencing system 804, such as the event alerting module 884 of the event coreferencing and alerting module 836 of FIG. 9. The method begins at step 2202. At step 2204, a trigger condition for providing an alert may be determined to have occurred. The trigger condition may be one or more of the generation of the coreferenced event by the event coreferencing and alerting module 804, passage of predetermined amount of time since a previous alert, receipt of a request for an alert by the API module 1054, etc. At step 2206, the types and recipients of the alert may be determined. For example, an operator of the event detection and coreferencing system 804 may provide both an alert publishing service and an alert API service that may be subscribed to by persons and organizations desiring to receive alerts. The event alerting module 884 may maintain a list of recipients for different types of alerts, such as for publication or provision by API, and determine from the list a set of recipients and corresponding alert types for alert generation upon occurrence of the alert trigger. At step 2208, for embodiments including alert publication, the alert is generated and published by the publication module 1050. The alert publication may take a variety of forms. For example, the alert may be included in an email or text message addressed to a recipient, such as the user or user system 820, that has subscribed to such a service, and the publishing include transmitting the email or text message to the recipient. In another example, the alert may be included in a feed, such as an RSS feed, and the publishing include providing the feed to the recipient that has subscribed to such a service. At step 2210, for embodiments including event provision by API, the alert is generated and provided by the API module 1054. For example, the alert may by transmitted to the interface module 902 of the user system 820 in response to a request to the API module 1054 from an alert application executing on the user system 820. The method ends at step 2212.

In embodiments, a method of providing an alert for a coreferenced event may include only any subset of, or an alternative ordering of, the features depicted in or discussed above in regard to FIG. 22.

FIGS. 23A-23C depict embodiments of an email, text message, and feed item, respectively, that the publishing module may transmit to the user system. In FIG. 23A, the email is addressed to a subscriber of an alert service, and contains a coreferenced event representation, a copy or link to a news article referencing the coreferenced event, a copy of or link to a social media cluster referencing the coreferenced event, and a link for further information such as additional coreferenced event representation attributes, additional news articles referencing the coreferenced event, additional social media postings referencing the coreferenced event, etc. In FIG. 23B, the text is addressed to a subscriber of an alert service, and contains a summary of the coreferenced event, and a link for further information such as coreferenced event representation attributes, news articles referencing the coreferenced event, social media postings referencing the coreferenced event, etc. In FIG. 24C, the feed item contains a coreferenced event representation, a copy or link to a news article referencing the coreferenced event, a copy of or link to a social media cluster referencing the coreferenced event, and a link for further information such as additional coreferenced event representation attributes, additional news articles referencing the coreferenced event, additional social media postings referencing the coreferenced event, etc.

FIG. 24 depicts an embodiment of a display of an alert application that the interface module of the user system may execute and display to the user for interfaceing with the API module of the cross-media event extraction and coreferencing system to request and receive alerts. The application display includes a section 1066 for the user to indicate the types, timeframe and location of events that it wants to request and receive alerts for, a section 1070 to display alerts and included event representations that it has received in response to requests, and a section 1074 to display further information for the events.

As indicated above, in embodiments, the cross-media event detection and coreferencing system 804 also may receive event information from the event production system 816, and process and store this event information in an event representation form as used for the news article, social media and coreferenced events. In embodiments that receive such event information, the event coreferencing and alerting module 836 may incorporate such event representations into its coreferencing, coreferenced event representation generation, and alerting. That is, the event coreferencing and alerting module 836 may determine whether the event referenced by the event representation based on the information received from the event production system 816 coreferences an event referenced by either a news article, or a social media cluster, or coreferenced by both a news article and social media cluster.

Figure 25:
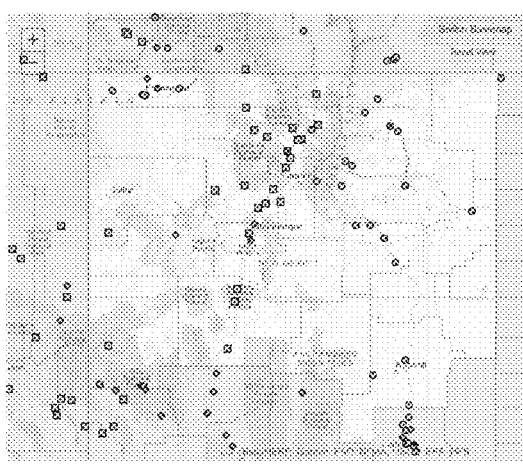
FIG. 25 is a map depicting embodiments of event information of an event production system.
Figure 26:
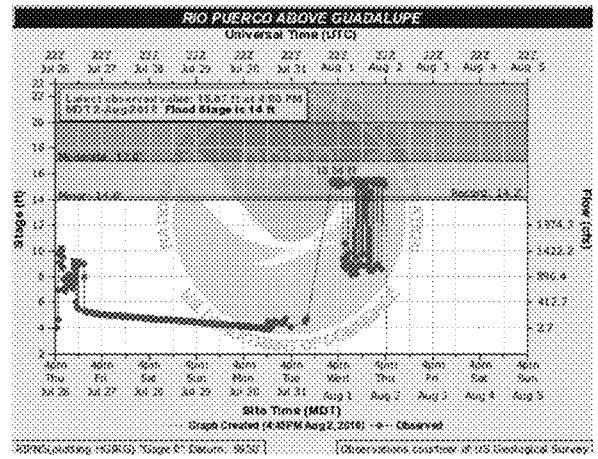
FIG. 26 is a chart depicting embodiments of event information of an event production system.

FIGS. 25 and 26 depict embodiments of event information of the event production system 816 that may be retrieved and utilized by the cross-media event detection and coreferencing system 804. FIG. 25 depicts a map showing flood event information output by the National Oceanic and Atmospheric Administration, and FIG. 26 shows a detailed set of flood information for one location on the map in FIG. 25, showing a timewise evolution of a flooding state at the location.

In embodiments, the event coreferencing and alerting module 836, in addition to determining coreferencing between news articles and social media clusters, may also determine coreferencing between news articles and news articles, social media clusters and social media cluster, etc. That is, the event coreferencing and alerting module 836 may determine coreferencing between any event representation resulting from any source, and generate corresponding coreferenced event representations and alerts.

In embodiments, the event coreferencing and alerting module 836 may use the above system and methods to determine coreferencing between any two different types of media instead of or in addition to between news articles and social media.

Additional embodiments of the cross-media event extraction and coreferencing system 804, user system 820, news production system 808, social media system 812, event production system 816, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of providing cross-media event linking, the method comprising:
    receiving, at a first input of an event coreferencing system, a stream of social media postings, and at a second input of the event coreferencing system, a stream of news articles;
    generating, by the event coreferencing system, a first set of event representations representing events referenced by the social media postings, and a second set of event representations representing events referenced by the news articles;
    determining, by the event coreferencing system, that at least one of the social media postings references a same event referenced by at least one of the news articles, the determining including determining at least one similarity using data of at least one of the first set of event representations corresponding to the at least one of the social media postings and data of at least one of the second set of event representations corresponding to the at least one of the news articles; and
    transmitting, by an output of the event resolution system to a user system, an alert including at least one coreferenced event representation representing the event referenced by the at least one of the social media postings and the at least one of the news articles.

2. The method of claim 1, the determining including performing a classification of whether at least one of the social media postings references a same event referenced by at least one of the news articles based on the at least one similarity.

3. The method of claim 1, wherein the coreferenced event representation includes at least one of: links to the at least one of the social media postings and at least one of the news articles, or the at least one of the social media postings and the at least one of the news articles.

4. The method of claim 1, wherein transmitting the alert includes at least one of:
    transmitting an email including the alert to the user system, transmitting a text message including the alert to the user system, or transmitting a feed including the alert to the user system.

5. The method of claim 1, wherein transmitting the alert includes transmitting the alert by an application programming interface (API) of the event coreferencing system.

6. The method of claim 5, wherein the API transmits the alert in response to a request by the user system.

7. The method of claim 1, further comprising controlling by the user system at least one component of the user system based on the alert.

8. The method of claim 7, wherein the controlling includes at least one of:
    operating a supply chain scheduling controller to schedule a supply chain delivery based on the alert;
    operating a financial trading controller to execute a trade of a financial commodity based on the alert; or
    operating a manufacturing system controller to power down a manufacturing system component based on the alert.

9. The method of claim 1, wherein each event representation includes a plurality of attributes representing the corresponding event.

10. The method of claim 9, wherein each event representation includes a location of the event, a time of the event, and an impact of the event.

11. The method of claim 1, wherein the determining the at least one similarity includes determining at least one of:
  a temporal similarity between at least one time extracted from the at least one social media posting and at least one time extracted from the at least one news article;
  a spatial similarity between at least one location extracted from the at least one social media posting and at least one location extracted from the at least one news article;
  a person entity similarity between at least one person entity extracted from the at least one social media posting and at least one person entity extracted from the at least one news article;
  an organization entity similarity between at least one organization entity extracted from the at least one social media posting and at least one organization entity extracted from the at least one news article; or
  a text similarity between a text of the at least one social media posting and a text of the at least one news article.

12. The method of claim 1, wherein the determining the at least one similarity includes determining a temporal similarity between the at least one social media posting and the at least one news article, a spatial similarity between the at least one social media posting and the at least one news article, an entity similarity between the at least one social media posting and the at least one news article, and a text similarity between the at least one social media posting and the at least one news article.

13. The method of claim 1, wherein the determining the at least one similarity includes determining a spatial similarity between the at least one social media posting and the at least one news article by:
  determining feature vectors for a social media cluster and the at least one news article based on locations extracted from the at least one social media posting and the at least one news article, the social media cluster including the at least one social media posting;
  calculating similarities between each pair of locations of the at least one news article and the social media cluster using the feature vectors; and
  determining the spatial similarity as function of the determined similarities.

14. The method of claim 1, wherein the determining the at least one similarity includes determining a temporal similarity between the at least one social media posting and the at least one news article by:
  determining feature vectors for temporal expressions extracted from the at least one social media posting and the at least one news article; and
  determining the temporal similarity based on a minimum time difference between the temporal expressions in the feature vectors for the at least one social media posting and the at least one news article.

15. The method of claim 1, wherein the determining the at least one similarity includes determining a person entity similarity between the at least one social media posting and the at least one news article by:
  determining sets of person entities extracted from the at least one social media posting and the at least one news article; and
  determining a similarity between the sets of extracted persons for the at least one social media posting and the at least one news article.

16. The method of claim 1, wherein the determining the at least one similarity includes determining an organization entity similarity between the at least one social media posting and the at least one news article, including by:
  determining sets of organization entities extracted from the at least one social media posting and the at least one news article; and
  determining a similarity between the sets of extracted organization entities for the at least one social media posting and the at least one news article.

17. The method of claim 1, wherein the determining the at least one similarity includes determining a text similarity between the at least one social media posting and the at least one news article, including generating vectors for tokenized text of the at least one social media posting and the at least one news article based on word embeddings, and determining a similarity between the generated vectors.

18. The method of claim 1, wherein the generating the second set of event representations representing events referenced by the news articles includes:
  filtering out non-event related news articles;
  classifying types of events referenced by the news articles using feature vectors based on word embeddings for the news articles;
  determining candidate attributes of the second set of event representations using natural language processing;
  determining location attributes of the second set of event representations, including classifying candidate locations using feature vectors based on the candidate attributes;
  determining time attributes of the second set of event representations, including determining temporal expressions in the news articles and applying a rule based model to select specific ones of the temporal expressions as the time attributes; and
  determining impact attributes of the second set of event representations, including classifying pairs of numeric references of the candidate attributes and adjacent word sequences.

19. The method of claim 1, wherein the generating the second set of event representations representing events referenced by the news articles includes determining an impact attribute for a news article by:
  determining a sentence of the news article with a token having a cardinal number part-of-speech tag representing a numeric value;
  generating word sequences in a vicinity of the token in the sentence by constructing n-grams from each side of the token within the sentence;
  generating a feature vector for each sequence based on one or more of: word embeddings for the sequence, a length of the sequence, a pre or post offset of the token relative to the sequence, a part-of-speech for words in the sequence, entity types of the word sequence, dependency tree relations of the word sequence; and
  classifying each generated pairs of numeric value and word sequence feature vector as either indicating a human impact or not.

20. The method of claim 1, wherein the generating the second set of event representations representing events referenced by the social media postings includes:
  filtering out noise postings representing spam and chit chat;
  detecting and generating clusters of the social media postings, each cluster of social media postings referencing an event;

classifying types of events referenced by the clusters of the social media postings;

removing any of the clusters of social media postings related to events older than a predetermined current time period;

determining summaries for the clusters of the social media postings;

determining location attributes for the clusters of the social media postings;

determining time attributes for the clusters of the social media postings; and determining impact attributes for the clusters of the social media postings.

21. A system for providing cross-media event linking, the system comprising:

at least one non-transitory machine readable storage medium storing program instructions; and at least one processor configured to execute the program instructions to perform a method of providing cross-media event linking, the method including:

receiving, at a first input of an event coreferencing system, a stream of social media postings, and at a second input of the event coreferencing system, a stream of news articles;

generating, by the event coreferencing system, a first set of event representations representing events referenced by the social media postings, and a second set of event representations representing events referenced by the news articles;

determining, by the event coreferencing system, that at least one of the social media postings references a same event referenced by at least one of the news articles, the determining including determining at least one similarity using data of at least one of the first set of event representations corresponding to the at least one of the social media postings and data of at least one of the second set of event representations corresponding to the at least one of the news articles; and transmitting, by an output of the event resolution system to a user system, an alert including at least one coreferenced event representation representing the event referenced by the at least one of the social media postings and the at least one of the news articles.

22. The system of claim 21, wherein the determining includes performing a classification of whether at least one of the social media postings references a same event referenced by at least one of the news articles based on the at least one similarity.

23. The system of claim 21, wherein transmitting the alert includes at least one of: transmitting an email including the alert to the user system, transmitting a text message including the alert to the user system, or transmitting a feed including the alert to the user system.

24. The system of claim 21, wherein transmitting the alert includes transmitting the alert by an application programming interface (API) to the user system, wherein the API transmits the alert in response to a request by the user system.

25. The system of claim 21, the method further comprising controlling by the user system at least one component of the user system based on the alert.

26. The system of claim 21, wherein each event representation includes a plurality of attributes representing the corresponding event, including a location of the event, a time of the event, and an impact of the event.

27. The system of claim 21, wherein the determining the at least one similarity includes determining at least one of: a temporal similarity between the at least one social media posting and the at least one news article, a spatial similarity between the at least one social media posting and the at least one news article, an entity similarity between the at least one social media posting and the at least one news article, and a text similarity between the at least one social media posting and the at least one news article.

28. At least one non-transitory machine readable storage medium having program instructions, which when executed by at least one processor perform a method of providing cross-media event linking, the method including:

receiving, at a first input of an event coreferencing system, a stream of social media postings, and at a second input of the event coreferencing system, a stream of news articles;

generating, by the event coreferencing system, a first set of event representations representing events referenced by the social media postings, and a second set of event representations representing events referenced by the news articles;

determining, by the event coreferencing system, that at least one of the social media postings references a same event referenced by at least one of the news articles, the determining including determining at least one similarity using data of at least one of the first set of event representations corresponding to the at least one of the social media postings and data of at least one of the second set of event representations corresponding to the at least one of the news articles; and transmitting, by an output of the event resolution system to the user system, an alert including at least one coreferenced event representation representing the event referenced by the at least one of the social media postings and the at least one of the news articles.

* * * * *